United States Patent
Sibley

(10) Patent No.: US 10,242,457 B1
(45) Date of Patent: Mar. 26, 2019

(54) AUGMENTED REALITY PASSENGER EXPERIENCE

(71) Applicant: Zoox, Inc., Menlo Park, CA (US)

(72) Inventor: Gabriel Thurston Sibley, Menlo Park, CA (US)

(73) Assignee: Zoox, Inc., Foster City, CA (US)

(*) Notice: Subject to any disclaimer, the term of this patent is extended or adjusted under 35 U.S.C. 154(b) by 67 days.

(21) Appl. No.: 15/463,277

(22) Filed: Mar. 20, 2017

(51) Int. Cl.
*G06T 7/73* (2017.01)
*G06T 11/60* (2006.01)
*G09G 3/00* (2006.01)

(52) U.S. Cl.
CPC ............ *G06T 7/73* (2017.01); *G06T 11/60* (2013.01); *G09G 3/003* (2013.01); *G06T 2207/30201* (2013.01); *G06T 2207/30252* (2013.01); *G09G 2320/10* (2013.01); *G09G 2340/12* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 8,924,150 | B2* | 12/2014 | Tsimhoni | G01C 21/365 340/691.1 |
| 2004/0223190 | A1* | 11/2004 | Oka | G06T 15/205 358/302 |
| 2009/0171570 | A1* | 7/2009 | Chiba | G01C 21/3682 701/532 |
| 2012/0173069 | A1* | 7/2012 | Tsimhoni | G01C 21/365 701/25 |
| 2012/0250940 | A1* | 10/2012 | Kasahara | G06F 3/011 382/103 |
| 2013/0138343 | A1* | 5/2013 | Choi | G01C 21/3679 701/527 |
| 2013/0222364 | A1* | 8/2013 | Kraus | G06Q 30/02 345/419 |
| 2014/0218361 | A1* | 8/2014 | Abe | G06T 19/006 345/424 |
| 2014/0267416 | A1* | 9/2014 | Douris | H04W 4/21 345/633 |
| 2015/0015608 | A1* | 1/2015 | Park | G06T 19/006 345/633 |
| 2015/0062168 | A1* | 3/2015 | Ng-Thow-Hing | G02B 27/01 345/633 |

(Continued)

*Primary Examiner* — David H Chu
(74) *Attorney, Agent, or Firm* — Lee & Hayes, P.C.

(57) ABSTRACT

Systems and methods for providing content to passengers within a passenger compartment of a vehicle based on pose estimation and/or gaze detection. The system can obtain sensor data, such as image data, representing a passenger within a vehicle. The system can then analyze the sensor data using pose estimation to determine a pose of the passenger within the vehicle, and analyze the sensor data using gaze detection to determine a point of gaze of the passenger. Based on the pose and the point of gaze, the system can determine a surface within the vehicle for providing content. Additionally, the system can identify the content to provide, wherein the content can include general content or location-based content. After identifying the surface and the content, the system can provide the content to the passenger via the surface. In some examples, providing the content includes augmenting the outside environment with the content.

20 Claims, 19 Drawing Sheets

(56) References Cited

U.S. PATENT DOCUMENTS

| | | | |
|---|---|---|---|
| 2016/0004305 A1* | 1/2016 | Pagliani | G06F 3/013 |
| | | | 345/633 |
| 2016/0055673 A1* | 2/2016 | Broaddus | G06T 19/006 |
| | | | 345/633 |
| 2016/0163108 A1* | 6/2016 | Kim | G02B 27/0101 |
| | | | 345/633 |
| 2016/0260261 A1* | 9/2016 | Hsu | G06T 19/006 |
| 2017/0074676 A1* | 3/2017 | Kim | G01C 21/3679 |
| 2017/0200252 A1* | 7/2017 | Nguyen | G06F 3/013 |
| 2017/0280024 A1* | 9/2017 | Murugesan | G06F 3/013 |
| 2018/0061129 A1* | 3/2018 | Sisbot | G06T 19/006 |

* cited by examiner

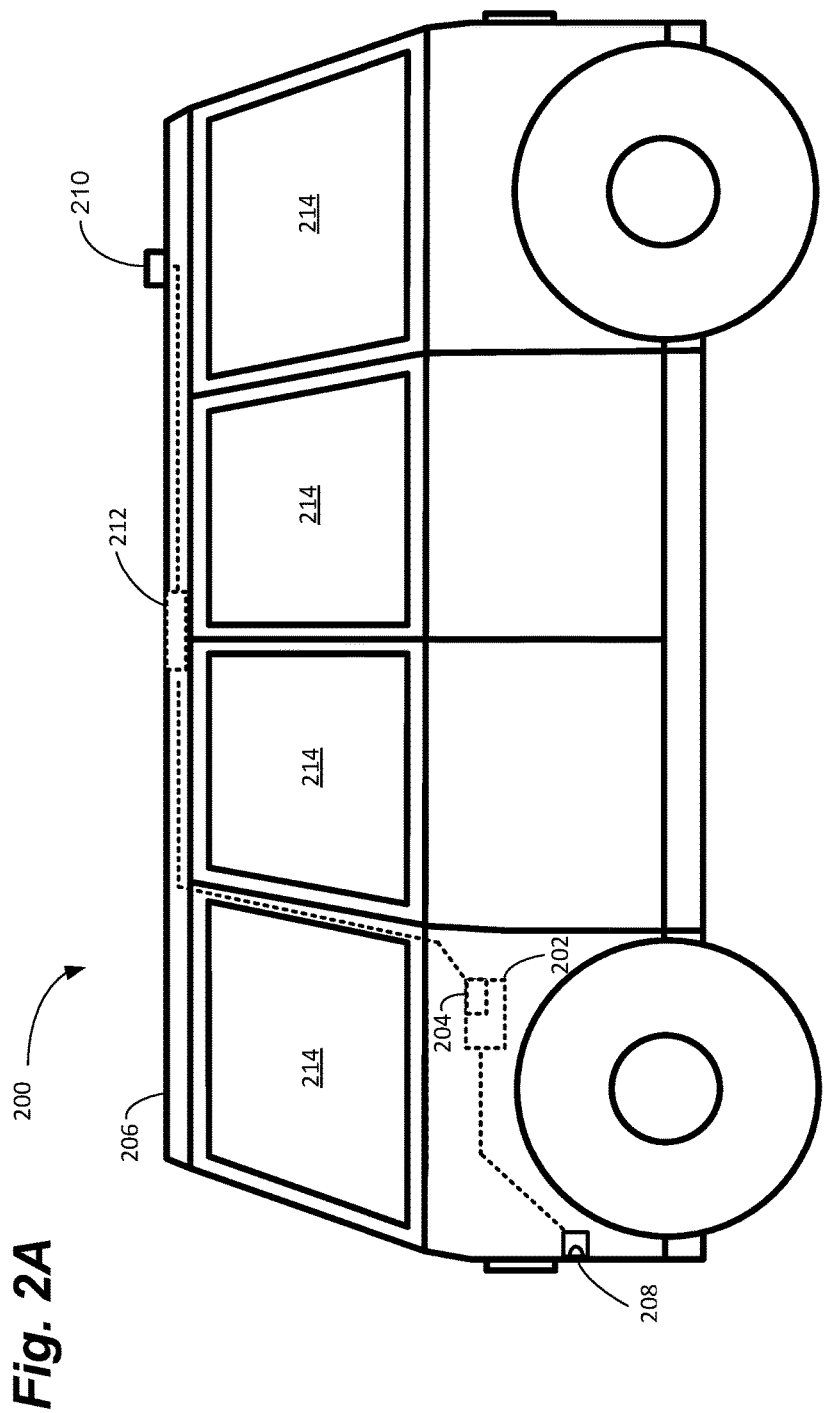

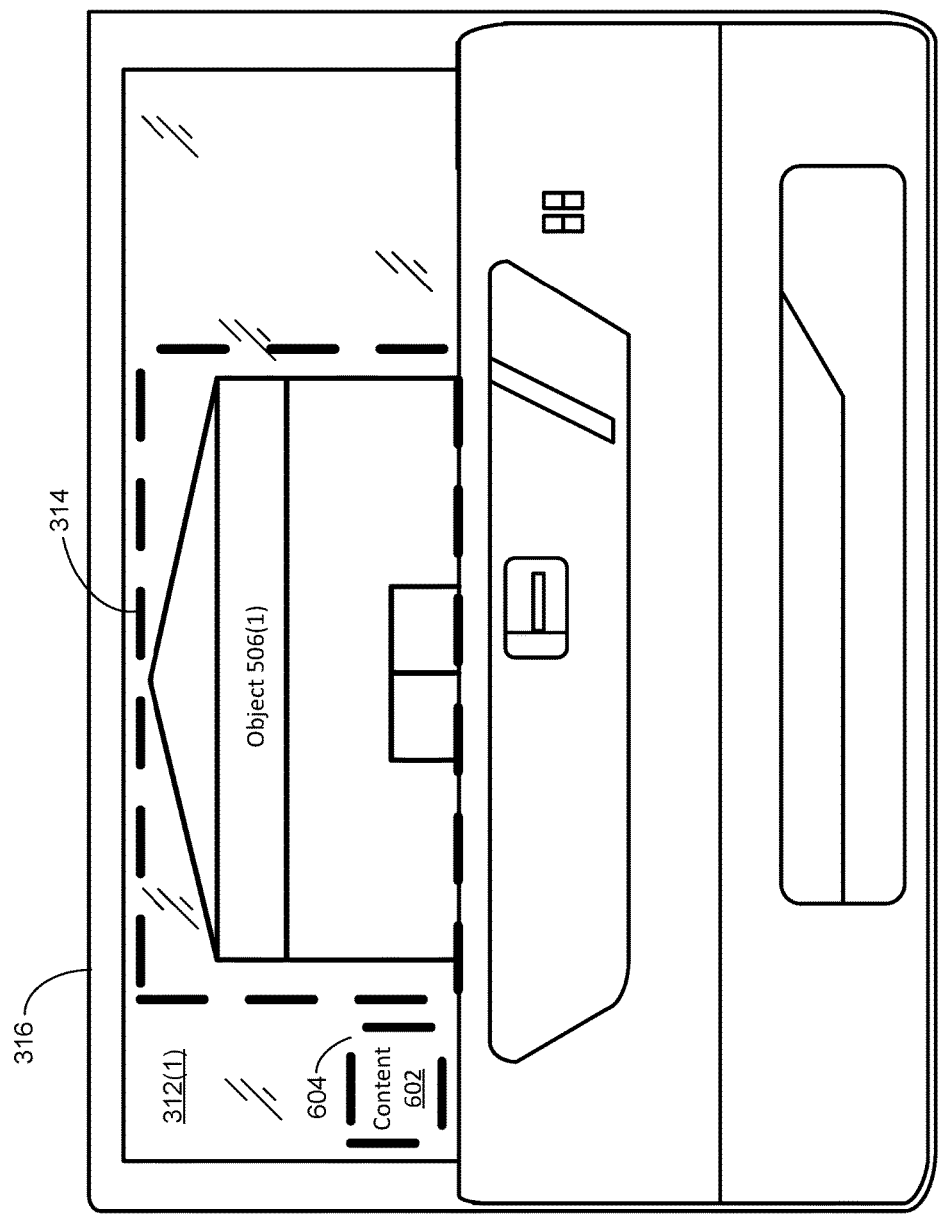

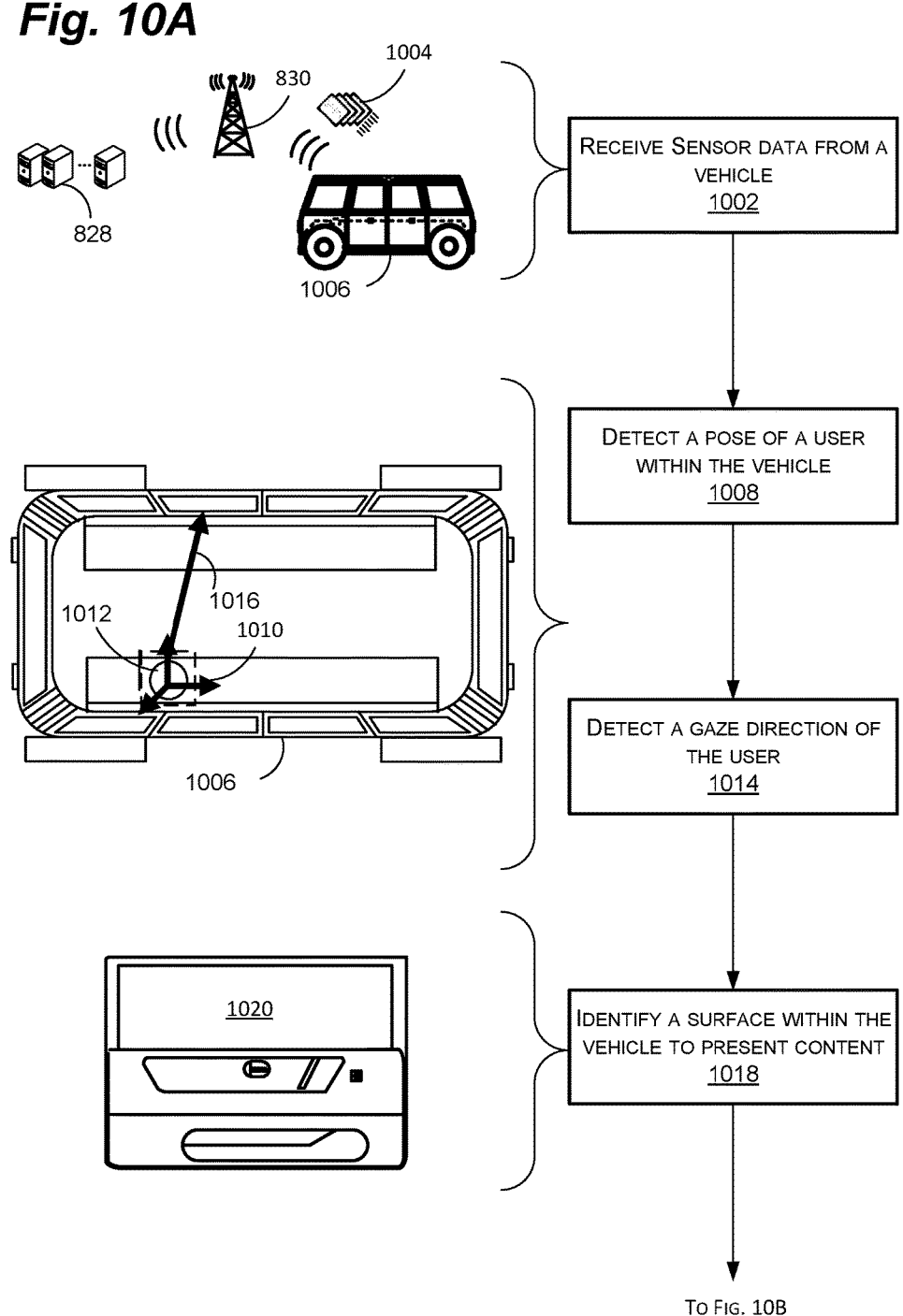

US 10,242,457 B1

AUGMENTED REALITY PASSENGER EXPERIENCE

BACKGROUND

Autonomous vehicles can improve the safety and efficiency of transportation systems. Autonomous vehicles rely on microprocessors and sensors to make routing and maneuvering decisions. As a result, in many cases, these vehicles can react more quickly and accurately to changing conditions than a human driver. Thus, autonomous vehicles can travel closer together and at higher speeds, for example, reducing congestion.

Autonomous vehicles can operate purely on sensor data. These vehicles can use data generated or received from, for example, one or more location systems (e.g., global positioning system (GPS) and/or cell tower location systems), proximity sensors, cameras, and/or other sensors to perform autonomous functions, such as, for example, staying in a particular lane, stopping for red lights, avoiding other vehicles and pedestrians, locating addresses and objects (e.g., bridges, building, etc.), and safely travelling from one location to another.

Passengers within these vehicles may utilize personal electronic devices in order to provide entertainment during transportation. However, by utilizing personal electronic devices, these passengers may fail to identify entertainment, such as restaurants, shopping centers, or movie theaters, that is within an area of operation of the vehicle. Therefore, techniques for providing content within the vehicle can improve the transportation experience for the passengers.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2A depicts a side view schematic diagram of a system that provides content in non-autonomous vehicles.

FIG. 6A depicts a first example of a system providing location-based content within a vehicle.

FIGS. 10A-10B are a flowchart depicting an example of a process of a remote system providing content within a vehicle.

DETAILED DESCRIPTION

Figure 1A:
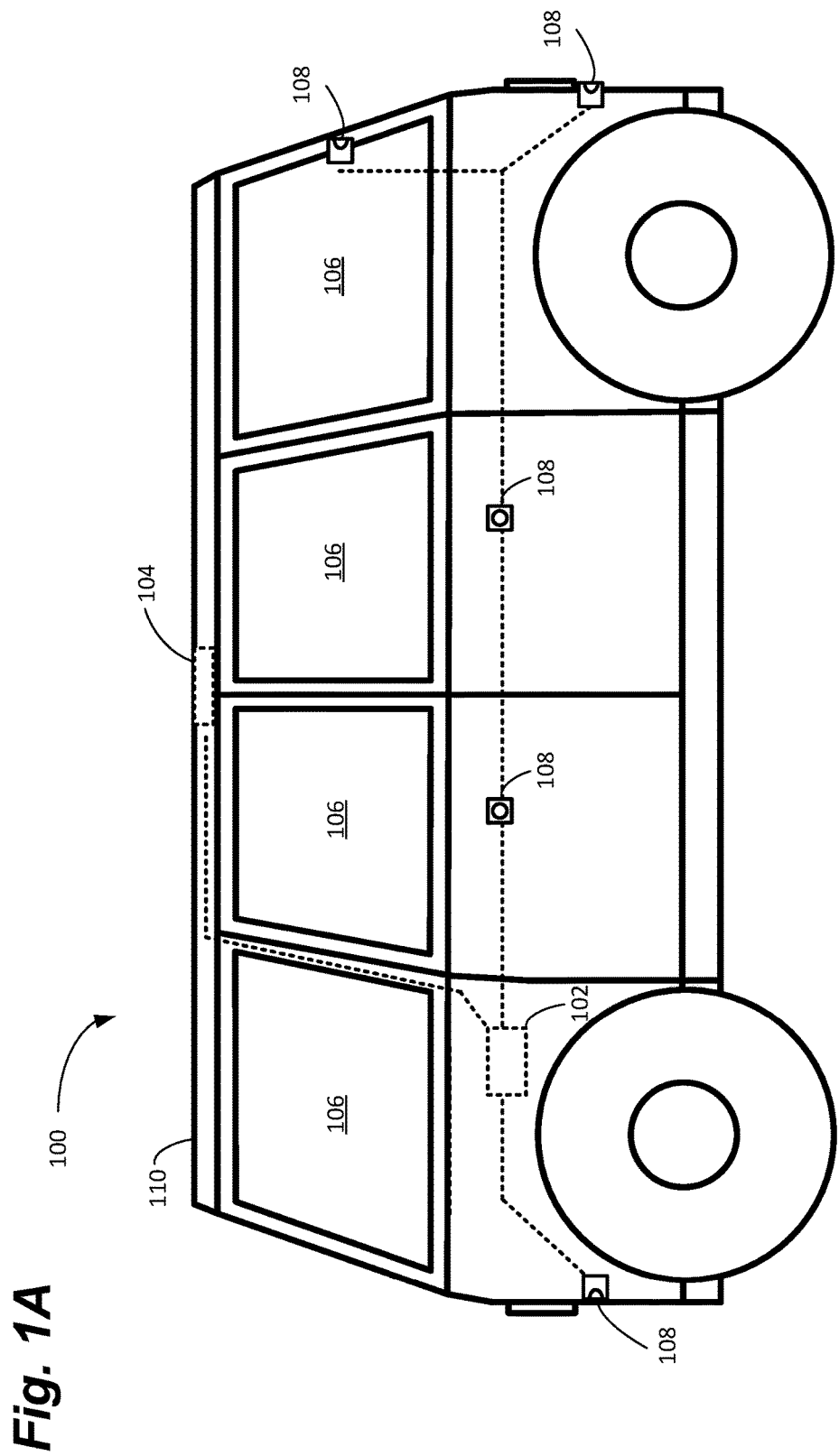
FIG. 1A depicts a side view schematic diagram of a system that provides content in autonomous vehicles.

The present disclosure is related to systems and methods for providing content to at least one passenger (e.g., a driver, a passive passenger, etc.) within a passenger compartment of a moving vehicle. Such systems and methods may be based on a pose of an autonomous vehicle in an environment, location of objects displaced about such a vehicle, and pose estimation and/or gaze detection (e.g., eye tracking) of a passenger in the moving vehicle. Such content may be presented in a way so as to create a unique experience for any passengers therein. For example, based on information about vehicle pose, environment information, passenger information, and the like, content may be delivered in such a way as to created augmented reality experiences.

In some examples described herein, the vehicle may be an autonomous driverless vehicle in which all of the passengers are passive passengers and non-drivers, although aspects described herein may also be used in autonomous vehicles in which drivers can be assisted at times with automated options and/or non-autonomous vehicles in which drivers are fully in control of the vehicles.

In some examples, the system can provide content to the passenger within the passenger compartment using one or more surfaces within the vehicle. For instance, one or more of the windows of the vehicle may include a translucent display that is capable of allowing the passenger to view the environment outside of the vehicle, while at the same time, displaying content to the passenger such that the content looks superimposed with the environment. Additionally, in some examples, the system can provide the content to the passenger using one or more projectors. For instance, the vehicle may include one or more projectors that are capable to projecting content onto various surfaces within the vehicle, such as the dash of the vehicle, a door panel of the vehicle, or a window of the vehicle, or capable or projecting content onto various objects located outside of the vehicle. In some examples, providing content on translucent display surfaces and/or projectors may create an augmented or virtual reality experience for the passenger.

Such a system may rely on both information about a vehicle in an environment, as well as information about passengers viewing such content in the vehicle. Information about the vehicle may include pose information (i.e. a full position and orientation relative to some local or global coordinate system), as well as object information (e.g. object detections, classifications, and locations). One such method for obtaining vehicle pose is through the use of simultaneous localization and mapping (SLAM). SLAM may incorporate various sensor modalities (e.g. cameras, lidar, radar, etc.) through the use of particle filters, Kalman filters, bundle adjustment, or the like, to localize a vehicle in a 3D map. Such sensor modalities may also provide indications of objects in the environment. For example, various object detection algorithms (e.g. convolutional neural networks, support vector machines, etc.) may indicate the presence of other vehicles, pedestrians, buildings, and the like, as well as their location relative to the vehicle.

In addition to determining information about the vehicle in the environment, the system may also determine where the passenger is sitting within the vehicle and/or where the passenger is looking. The system includes or makes use of any number of sensors that are provided to detect passenger location, posture, pose, gaze, and so forth. The system obtains sensor data from these sensors that represent the passenger within the vehicle. For instance, in some examples, the system can obtain image data representing the passenger within the vehicle using one or more cameras. The system can then analyze the sensor data using pose estimation to determine a pose of the passenger within the vehicle. For instance, the system can analyze the sensor data using one more computer-vision algorithms associated with pose estimation to determine a pose of a head of the passenger, where the pose can include the three-dimensional location (e.g., (X,Y,Z) coordinates) and/or orientation of the head of the passenger within the vehicle.

Additionally, or alternatively, in some instances, the system can analyze the sensor data using the one or more computer-vision algorithms associated with pose estimation to determine the three-dimensional location (e.g., (X,Y,Z) coordinates) and orientation of the eyes of the passenger with respect to the head of the passenger. When analyzing the sensor data using pose estimation, the system can utilize one or more analytic methods, geometric methods, genetic algorithm methods, learning-based methods, or other type of pose estimation techniques to determine the pose of the passenger.

Additionally, the system can analyze the sensor data using one or more computer-vision algorithms associated with gaze detection (e.g., eye tracking) in order to determine a point of gaze (e.g., gaze direction) of the passenger. In some examples, the point of gaze corresponds the direction in which the passenger is currently looking within the vehicle. For instance, in some examples, the system can utilize one or more computer-vision algorithms to analyze the sensor data in order to detect the face of the passenger (which, in some instances, may use the pose to detect the face of the user) and, based on detecting the face, monitor the pupil of each of the eyes of the passenger. While monitoring the pupils, the system can calculate the direction in which the passenger is currently looking. When analyzing the sensor data using gaze detection, the system can utilize one or more video-based eye tracking techniques, infrared/near-infrared eye tracking techniques, bright-pupil tracking techniques, passive light tracking techniques, or the like.

Using the pose estimation and the gaze detection, the system can identify a surface within the vehicle, or an object or location external to the vehicle, on which to present the content that is consistent with the passenger's line-of-sight. For instance, the system can utilize one or more algorithms to determine a region of interest for the passenger within the vehicle using the pose of the head of the passenger (e.g., three-dimensional location and/or the orientation of the head of the passenger), the three-dimensional location and orientation of the eyes of the user, and/or the point of gaze of the passenger. In some instances, the region of interest can correspond to a focal point of the passenger. The system can then identify the surface for providing the content based on the region of interest.

For instance, in some examples, the system may determine that the passenger is looking at a translucent display of the vehicle, which may include one of the windows. In such examples, the system can determine that the surface for presenting the content includes the translucent display. Additionally, in some examples, the system may determine that the passenger is looking at different surface within the vehicle, such as the dash of the vehicle, a door panel of the vehicle, the back of a seat of the vehicle, or the like. In such examples, the system can identify the surface for providing content as the surface in which the passenger is looking.

In addition to determining the location within the vehicle for providing content, the system can identify the content to provide to the passenger. Content can include advertisements, videos (e.g., movies, television shows, etc.), text (e.g., books, news articles, etc.), games, educational material, music, images, or any other type of content that the system can provide to the passenger. In some examples, the system can identify general content (e.g., not location-based content) for the passenger. For instance, the system can receive a profile that is associated with the passenger. The profile can include data indicating preferences of the passenger, such as the passenger's favorite television shows/movies, books, retail stores, restaurants, geographic locations, music, or the like. The system can then use the profile to identify the content for the passenger. For example, the system can select one of the passenger's favorite movies to provide to the passenger. For another example, if the profile indicates that the passenger prefers a country scene rather than a city scene, the system can select content that represents a vehicle driving through the country.

In addition to using the profile of the passenger, the system can use data from an electronic device of the passenger to identify content. For instance, in some examples, the vehicle may be associated with a third-party service (e.g., a remote system), such as taxi service and/or some other type of ride sharing service. In such examples, the passenger may utilize a software application executing on the electronic device to send a request to the third-party service for a vehicle. When sending the request, the electronic device may further send the third-party service data indicating the preferences of the passenger. The third-party service can then dispatch the vehicle to the passenger's location, and send the vehicle the data indicating the preferences of the passenger. At a time that the vehicle picks the passenger up, the system can use the data to identify the content for the passenger.

In some examples, in addition to, or alternatively from, sending the data to the third-party service, the electronic device of the passenger can directly send the data to the system. For instance, the passenger may enter the vehicle with his or her electronic device. When inside of the vehicle, the electronic device can send the data to the system using one or more short-range wireless communications, such as Bluetooth, Zigbee, or the like. In some examples, the electronic device can automatically send the data to the system. For instance, the electronic device may detect that the vehicle is within proximity of the electronic device, and then send the data in response. In some examples, the electronic device can send the data to the system based on receiving input from the passenger.

In addition to identifying general content for the passenger, the system can identify location-based content using a geographical location of the vehicle. For instance, in some examples, the system can identify content that is associated with one or more objects that are located in the environment outside of the vehicle. Content associated with an object can include advertisements relevant to the object (e.g., advertisements for goods and/or services provided by the object), information describing the object, graphical images that represent the object (e.g., logos, trademarks, etc.), audio clips associated with the object, content provided to the system by the object, or the like.

For instance, as mentioned briefly above, the system can use one or more sensors to determine a pose of the vehicle in an environment. In addition to data of objects in an environment stored in a map (e.g. a 2D or 3D map), such a system may additionally, or in the alternative, use one or more sensors to detect and/or classify objects from raw sensor data. Additionally, or in the alternative, the system may provide position and/or orientation of the objects either relative to the vehicle or with respect to some coordinate system (e.g. a global or local coordinate system). In some examples, objects can include natural objects and man-made objects. Natural objects can include any natural feature associated with an environment, such as mountains, plateaus, forests, trees, national parks, natural landmarks, or the like. Man-made objects can include any man-made feature associated with the environment, such as structures (e.g., shopping centers, restaurants, bridges, merchant locations, homes, etc.), signs, other vehicles, man-made landmarks, or the like.

To identify objects that are proximate to the vehicle, the system can identify objects that are within a predetermined distance of the vehicle. For instance, the system can use the map data and the vehicle pose to identify one or more objects that are within one block, one hundred feet, one mile, or the like of the vehicle. Additionally, or in the alternative, such objects may be detected, classified, and associated with a position and/or orientation using sensor data provided by one or more sensors. For example, camera images may be input into convolutional neural networks and/or support vector machines to detect and classify objects. Additionally, or in the alternative, similar algorithms may be used to estimate a position and/or orientation of such objects. In some examples, the system uses a common geographic distance when identifying objects that are proximate to the vehicle. In some examples, the system can use a varying distance when identifying objects that are proximate to the vehicle. For instance, the system may use a first, longer distance when the vehicle is located within a geographic region (e.g., a city) that includes numerous objects, and use a second, shorter distance when the vehicle is located in a geographic region (e.g., the country) that includes few objects.

In addition to using a predetermined distance, the system can use a projected route of the vehicle to identify objects that are proximate to the vehicle. For instance, the system can acquire sensor data from one or more sensors of the vehicle that indicates a direction of travel for the vehicle. In some instances, the sensor data can include both a current location of the vehicle and well as a destination location for the vehicle. The system can then use the sensor data to map a projected route for the vehicle. Using the map data associated with the geographic region that includes the vehicle, the system can then identify objects stored in the map that are located along the route of the vehicle. In some examples, when the projected route of the vehicle changes, such as due to traffic condition or some other factor, the system can continually use the sensor data to track a new projected route for the vehicle, such as via any of the localization methods described above. The system can then use the map data to update the identified objects using the new route.

In some examples, the system can further use one or more exterior sensors of the vehicle to identify objects that are proximate to the vehicle. For instance, the system can obtain sensor data, such as image data, representing the environment around the vehicle from the one or more exterior sensors. The system can then analyze the sensor data using one or more computer-vision algorithms to identify objects that are located in the environment and proximate to the vehicle. In some examples, the system analyzes the sensor data using one or more object recognition techniques to identify the objects. For instance, the system can utilize one or more appearance-based methods (e.g., edge matching, divide-and-conquer search, greyscale matching, etc.), feature-based methods (e.g., interpretation trees, hypothesize and test, pose consistency, etc.), or any other type of object recognition method to identify the objects.

In some examples, when identifying objects that are proximate to the vehicle, the system can utilize the pose estimation and/or the gaze detection to identify an object of interest for the passenger. For example, the system can determine that the surface of the vehicle that the passenger is focusing on includes a translucent display of the vehicle. The system can further determine an orientation of the vehicle using sensor data from one or more sensors of the vehicle. Based on which translucent display that the passenger is focusing on, and based on the orientation of the vehicle, the system can identify at least one object that is visible to the passenger through the translucent display using the map data. For instance, the system can identify an object that is within the line of sight of the passenger through the translucent display, and then determine that the object is an object of interest for the passenger.

For another instance, the passenger may be looking through the translucent display at a specific object that is located in the environment outside of the vehicle. To identify the specific object, the system can utilize the map data, information about the object (e.g. its size, position relative to the vehicle, classification, etc), the pose of the passenger relative to the vehicle, and the gaze detection to determine that the passenger is focusing on the specific object. For instance, the system can identify a line of sight for the passenger using the pose (e.g., the three-dimensional location and/or orientation of the head of the passenger), the three-dimensional location and orientation of the eyes of the passenger, and/or the gaze direction of the passenger. Such a representation may be described with respect to the reference frame of the car, or some global coordinate system. The system can then utilize one or more algorithms to determine that a region of interest of the passenger includes the specific object based on one or more of the map data, the location and/or orientation of the vehicle, any detected objects, the position and/or orientation of any detected objects, and the line of sight of the passenger. Based on the determination, the system can determine that the specific object includes an object of interest for the passenger.

In some examples, as discussed above, the system can then identify content to present to the passenger based on one or more identified objects. For instance, and using the object of interest as an example, the system can identify content that is associated with the object of interest. Content associated with the object of interest can include advertisements relevant to the object of interest (e.g., advertisements for goods and/or services provided by the object of interest), information describing the object of interest, graphical objects that represent the object of interest (e.g., logos, trademarks, etc.), audio clips associated with the object of interest, or the like.

In some instances, the system can identity the content using a profile associated with the object of interest. For example, the system may store profiles for one or more objects in a database, where each profile includes content that is associated with a respective object. To identify content for the object of interest, the system can use an identity of the object of interest to search the database to identity a profile that is associated with the object of interest. The system can then identify content that is associated with the object of interest using the profile. In some instances, when multiple types of content are included in the profile, the system can select content based on one or more factors. For instance, the system can select content based on a time of day, a location of the object of interest, preferences of the passenger (e.g., from the passenger's profile), a time of the year, the weather, traffic conditions, and/or the like.

After identifying the content, either the general content or the location/based content, the system can provide the content to the passenger. For instance, when the surface within the vehicle includes a translucent display (e.g., a window), the system can cause the translucent display to display the content to the passenger, or the system can project the content onto the translucent display. For instance, in some examples, the system may cause the translucent display to augment the outside environment with the content by displaying the content for the passenger at a designated location on the window. As above, such augmentation may create a suggestion in the passenger's mind that the content is either part of the object or naturally occurring in the environment. In some examples, the system may cause the translucent display to augment the object for the passenger using the content. For instance, the system may use one or more of the map data, the pose estimation of the vehicle in the environment, the object in the environment, and/or the passenger, the three-dimensional location and orientation of the eyes of the passenger, and/or the gaze detection to determine a portion of the window at which the object is visible to the passenger (i.e., the focal point of the passenger on the translucent display). The system can then use that determination to augment the object for the passenger using the content. For instance, the system can cause the translucent display to display the content in such a way that the content looks superimposed on the object for the passenger through the translucent display.

Generally, augmenting refers to the process of adding information, such as displaying images or video sequences (e.g., content) over an existing scene, whether real or synthetic. In some examples, where content is used to augment the environment, an object within the environment, or otherwise, the content may be transformed, such as by some projective geometry, to create the illusion to the passenger that the content was naturally appearing in the environment or on the object. As would be appreciated by one skilled in the art, such a transformation may be based, at least in part, on a gaze direction of the passenger, a pose and/or location of the passenger's eyes relative to a display surface, a location of the object relative to the passenger, and a geometry of the object.

In some examples, rather than augmenting the outside environment with the content, the system can provide the passenger with more of a virtual reality type experiences. For example, the system can cause the translucent display to display the content in such a way that the outside environment is no longer visible to the passenger. For instance, and using the example above where the passenger prefers a country type scene rather than a city type scene, the system can cause one or more of the translucent displays of the vehicle (e.g., one or more of the windows) to display content associated with the country, such as fields and trees, while at the same time, causing the one or more translucent displays to no longer look translucent to the passenger.

Generally, virtual reality refers to generating realistic images or video sequences (e.g., content), sound, or other sensations that replicate a real environment, and simulate the passenger's physical presence in the replicated environment. In some instances, when providing a virtual reality experience to a passenger, the passenger may be able to interact with the replicated environment and/or objects depicted within the replicated environment. For instance, one or more of the surfaces may include a display screen that can receive input from the passenger while providing the replicated environment. The system can then utilize the input to update the replicated environment for the passenger. For instance, the system can cause one or more projected objects within the replicated environment to change position, orientation, size, or the like, or the system can add additional objects to and/or remove objects from the replicated environment.

In some instances, the system can provide the passenger with a "360°" type virtual reality experience. For example, the system can cause each of the translucent displays (e.g., each of the windows) of the vehicle to provide the replicated environment to the passenger. For instance, and using the country scene example above, the system can cause each of the translucent displays of the vehicle to provide the country scene (e.g., the replicated environment) such that the system is providing a simulation of the vehicle driving through the country to the passenger.

In some examples, the system may use one or more additional types of electronic devices to provide the content within the vehicle. For example, the system can use one or more projectors to project the content at the surface within the vehicle. For another example, the surface may correspond to an additional display device within the vehicle, which does not include a translucent display of the vehicle. The system can then cause the additional display device to provide the content to the passenger. Still, for another example, the content may include audio content, and the system can cause the vehicle to output the audio content via one or more speakers of the vehicle.

In some examples, the system can augment the outside environment and/or one or more objects located in the environment by using one or more projectors to project content outside of the vehicle for the passenger. For instance, the system can identify an object located outside of the vehicle, such as an object of interest for the passenger. The system can then identify content to project on the object, such as general content and/or location-based content. Using at least one projector, the system can project the content onto the object of interest for the passenger. In some instances, before projecting the content, the system can first identify a surface of the object in which to project the content. For instance, the system can determine whether the object of interest includes a billboard, sign, and/or other type of surface for providing content to passengers. The system can then cause the at least one projector to project the content on the surface.

In some examples, the system can continuously perform the techniques described above to provide content to the passenger while the passenger is within the vehicle. For instance, the system can receive sensor data associated with a direction of travel of the vehicle. Using the sensor data, the system can continue to perform the techniques above to identify new objects that are proximate to the vehicle, and provide the passenger with content associated with the new objects. In some examples, while continually providing the passenger with new content, the system can determine that the passenger's focus has changed to a new surface within the vehicle (e.g., using additional sensor data that the system receives from the one or more sensors). In such examples, the system can provide the new content to the passenger using the new surface.

Although the description above describes providing content to a single passenger within the vehicle, the system can use similar techniques to provide content to multiple passengers within the vehicle. For instance, the system can use the techniques described above to identify, for each passenger within the vehicle, a surface for providing content. Additionally, the system can use the techniques described above to identify, for each passenger, content to present at the respective surface. The system can then provide each passenger with the respective content at the respective surface within the vehicle. As such, in some examples, the system can augment the outside environment for a first passenger that is focusing on a first translucent display (e.g., a first window) of the vehicle using first content, and augment the outside environment for a second passenger that is focusing on a second translucent display (e.g., second window) of the vehicle using second content.

The techniques above describe a context of using a driverless autonomous vehicle. In some instances, such a vehicle can include a level 5 "fully autonomous" type vehicle in which passengers within the vehicle include passive passengers. Additionally, or alternatively, in some instances, such a vehicle may include a different level of vehicle, such as a level 0, level 1, level 2, level 3, level 4, or any other level that can be designated, or in the future is designated, to a vehicle. Additionally, the vehicle can include passenger vehicles (e.g., personal vehicles such as cars and trucks; for hire vehicles such as taxis and shuttles; and public vehicles such as busses, passenger trains, boats, etc. The techniques are also applicable to non-passenger vehicles (e.g., freight trucks, delivery trucks, semi-trucks, freight trains, agricultural equipment, etc.). Also, while described in the context of ground vehicles, techniques according to this application are also applicable to aerial and marine vehicles. Still further, while techniques are described in the context of autonomous vehicles capable of transportation with limited or no active human control, the techniques are also applicable in other contexts, such as manually operated (i.e., non-autonomous) vehicles, bicyclists, pedestrians, or non-transportation uses of map data.

As used herein, "map data" refers broadly to data in any structure or format which provides an association between features and positions. This can include, but is not limited to, images, or pixels of an image, LIDAR or radar signatures, features associated with a particular coordinate reference (or other parameters), or points along a path. In some instances, map data may be associated with topologic maps, metric maps, semantic maps, street maps, rail maps, weather maps, GPS data, satellite images, geographic information, street-view images, coordinates, points of interest, addresses, construction information, accident information, traffic information, route information, driving directions, and electronic device data (e.g., location, rate of travel, acceleration, route, destination, images, video, etc.). In some instances, the map data can provide associations between objects within an environment and respective positions of each of the objects.

Additionally, by way of example and not limitation, the term "system," as used herein, may include a system built within the passenger vehicle that is providing the content, a system that can be retrofit into a vehicle, a system that is remote from the passenger vehicle, or any other type of system capable of providing content to passengers within a vehicle. A system can include components such as, for example, cameras, accelerometers, GPS receivers, cellular and wireless transceivers, magnetometers, altimeters, compasses, LIDARs, radars, ultrasonic transducers, gyroscopes, and other equipment, which can be used to compile and send data. The cameras can include, but not limited to, low- and high-resolution digital still and video cameras, stereoscopic cameras—which may be capable of providing ranging information—and vehicle camera arrays (e.g., parking cameras) with multiple views.

Figure 1B:
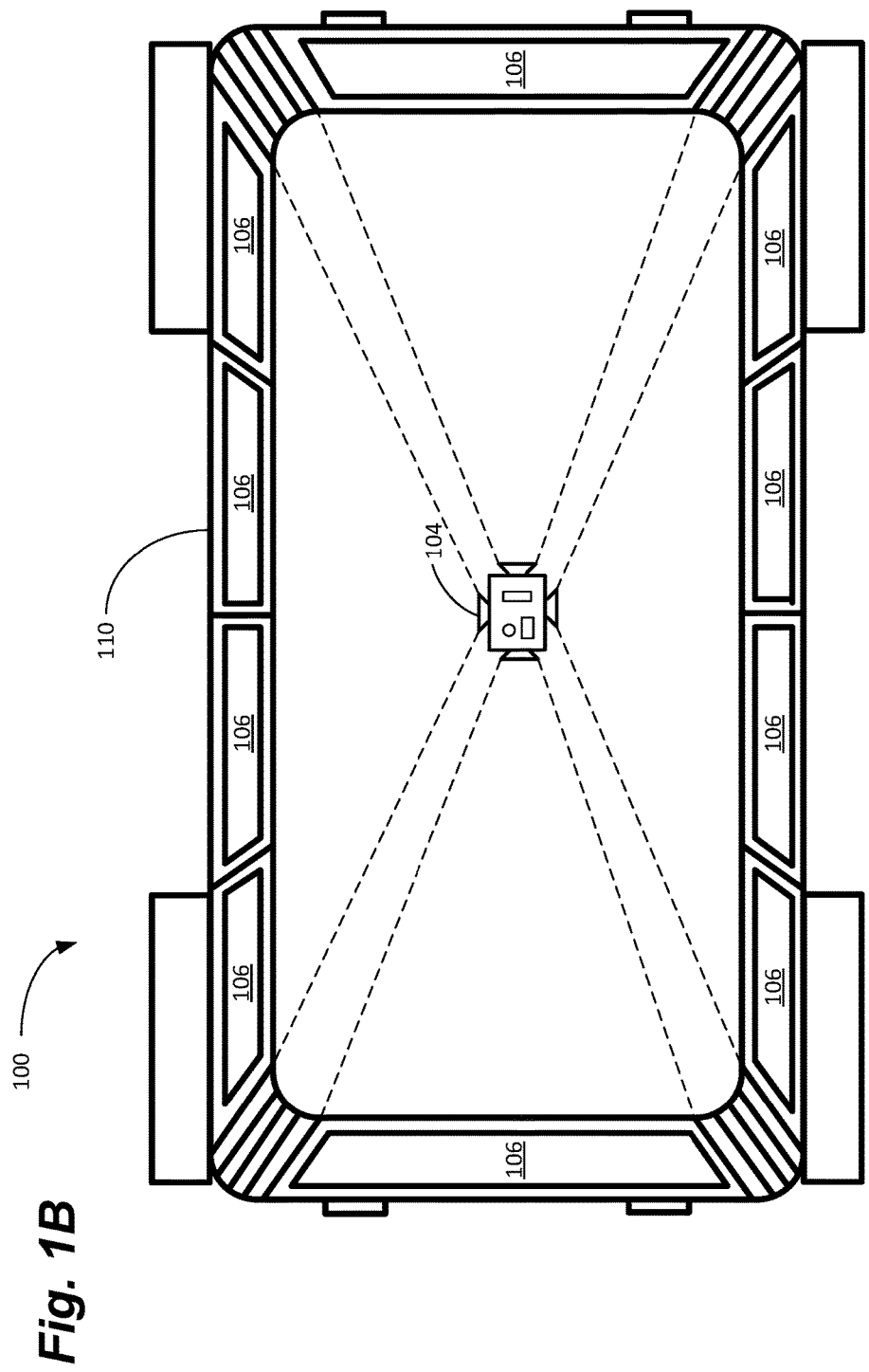
FIG. 1B depicts a top view schematic diagram of a system that provides content in autonomous vehicles.

In some examples, as shown in FIGS. 1A and 1B, therefore, generally speaking, a system 100 can comprise one or more of a controller 102, a video source 104, one or more display surfaces 106 (e.g., one or more windows that provide content, such as translucent displays), and sensors 108, which can include internal sensors (not shown) and external sensors 108. In the illustrated example, the system 100 is implemented within a passenger motor vehicle 110 that may be driven along roads and highways. In one example, the vehicle 110 is an autonomous, driverless vehicle in which there is no steering wheel or driver, but provides an internal carriage area for passengers to sit and ride in while the vehicle is moving. In some examples, the controller 102 can receive inputs from external sensors 108 of a vehicle 110 that enable the controller 102 to detect the motion of the vehicle 110, as well as to localize the vehicle 110 in a map. Such localization may be performed by various algorithms, such as, but not limited to SLAM, Kalman filters, particle filters, bundle adjustment, or the like. The controller 102 can be in communication with the various sensors 108 via a cable area network (CAN), local area network (LAN), wireless (e.g., Wi-Fi or Bluetooth®), or other suitable means.

The vehicle 110 can be equipped with a number and wide variety of sensors 108. These sensors 108 may enable various systems on the vehicle 110 to detect, for example, acceleration, deceleration, wheel slip, and turning of the vehicle 110. These systems can include, for example, antilock braking systems (ABS), traction control systems (TCS), and autonomous driving systems, among other things. The vehicle 110 can be equipped with cameras (video cameras, still camera, depth cameras, RGB-D cameras, RGB cameras, intensity cameras, time-of-flight cameras, thermographic cameras, or any other type of camera), radar, LiDAR, sonar (or other ultrasonic transducers), and/or other object detection or proximity sensors. The vehicle 110 can also be equipped with accelerometers, magnetometers, Inertial Measurement Units (IMUs), speed sensors, encoders, gyroscopes, and other equipment that report to a central processing unit (CPU) for the vehicle to measure acceleration, speed, orientation (e.g., direction of travel, roll, pitch, yaw, etc.), and other characteristics. The vehicle 110 may also be equipped with a global positioning system (GPS), magnetometer or electronic compass, and other navigational tools. Of course, if the vehicle 110 is a plane or boat, for example, then the vehicle 110 may also include additional or alternative sensors 108 to detect altitude, air speed, ground speed, water speed, and other motions.

As the vehicle 110 travels and maneuvers, therefore, the sensors 108 on the vehicle 110 can provide sensor data to the system 100 regarding the motion of the vehicle 110. As will be discussed in detail below, the system 100 can then use this sensor data, along with sensor data from one or more sensors within the vehicle, to provide content to passengers that are within the vehicle 110. For instance, the system 100 can use the sensor data from the sensors within the vehicle 110, which may be similar to the sensors 108, to perform pose estimation and/or gaze detection of one or more passengers within the vehicle 110. Additionally, the system 100 can use the sensor data from either the sensors within the vehicle 110 and/or the sensors 108 outside of the vehicle 110 to localize the vehicle 110, determine an orientation of the vehicle 110, determine a motion of the vehicle 110, as well as recognize, detect, and classify various objects in the environment. The system 100 can then use such determinations when identifying objects outside of the vehicle 110.

As shown, in some examples, the system 100 can be mounted in an autonomous vehicle 110. As a result, rather than having redundant, internal sensors, the controller 102 can receive input from the existing sensors 108 on the vehicle 110. Thus, an autonomous taxicab, for example, may be equipped with a full array of cameras and sensors (collectively sensors 108) to enable it to navigate autonomously. As mentioned above, this sensor data can be monitored by the controller 102 for use with the system 100. Thus, in some examples, at least translation and rotation of the vehicle 110 can be monitored.

Figure 2B:
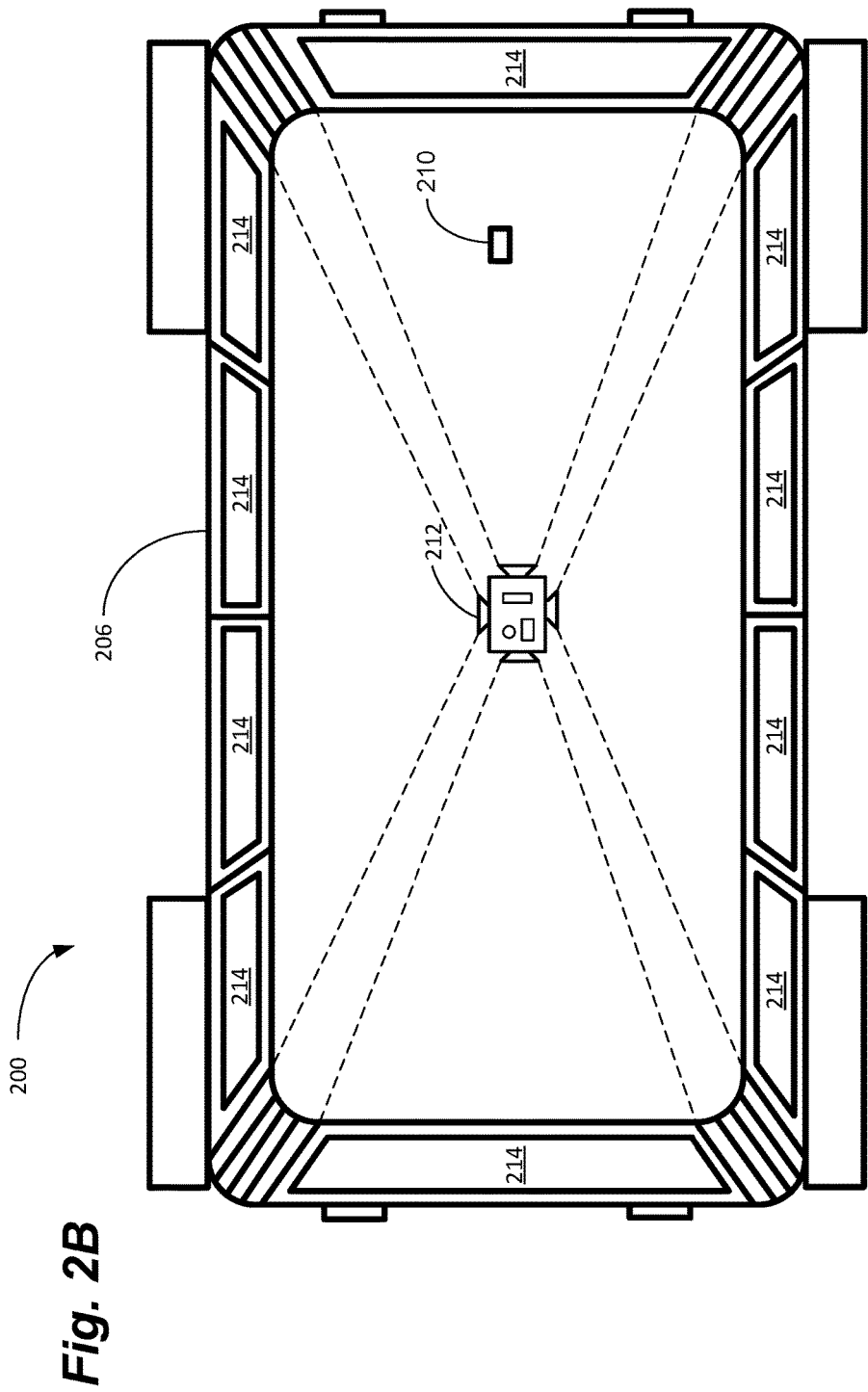
FIG. 2B depicts a top view schematic diagram of a system that provides content in non-autonomous vehicles.

In other examples, as shown in FIGS. 2A and 2B, the system 200 can include a controller 202 equipped with one or more internal sensors 204. In this case, the controller 202 can include one or more accelerometers, gyroscopes, magnetometers, IMUs, wheel encoders, GPS receivers, and other equipment, similar to those discussed above, but not associated with the vehicle 206. The system 200 can also include one or more cameras 208, GPS antennas 210, a video source 212, one or more display surfaces 214 (one or more windows that provide content, such as translucent displays), and/or other sensors that can be retrofitted to existing vehicles 206. This can enable the system 200 to be easily installed in vehicles 206 that are not equipped with autonomous systems, or other built-on sensors (e.g., internal sensors and/or external sensors 108 of vehicle 110).

As before, the system 200 can use input from the one or more internal sensors 204 to provide content to passengers that are within the vehicle 206. As discussed herein, the system 200 can include a video source 212, one or more display surfaces 214, or other means to provide the content. For instance, the one or more display surfaces 214 can display content to the passengers within the vehicle 206. In some examples, displaying the content can include augmenting the environment outside of the vehicle 206 with content. For instance, the one or more display surfaces 214 can augment one or more objects located in the environment outside of the vehicle 206 with the content. In some examples, the content is general content that the system 200 identifies for the passengers while, in some examples, the content includes location-based content that the system 200 identifies for the passengers.

Figure 3A:
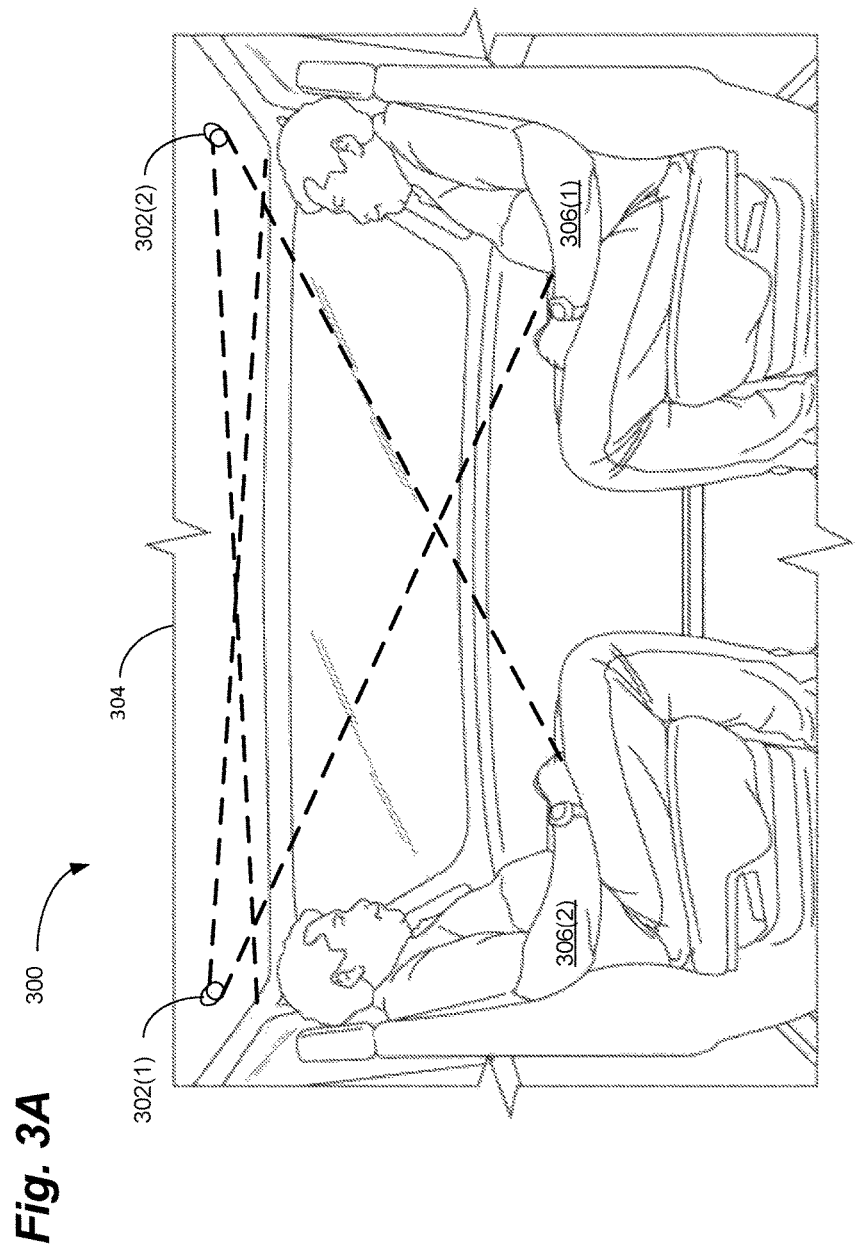
FIG. 3A depicts sensors acquiring data representing passengers within a vehicle.

To provide content to passengers within a vehicle, a system, such as the system 100 of FIG. 1 or the system 200 of FIG. 2, first determines a surface within the vehicle to provide the content, estimating a pose of a passenger's head and/or eyes, as well as gaze detection, and identifies the content to provide. For instance, FIG. 3A depicts a system 300 using sensors 302(1)-(2) to acquire sensor data associated with the passenger compartment of the vehicle 304. In some examples, the sensors 302(1)-(2) can include cameras capturing image data, such as still image data or video data, representing the passenger compartment of the vehicle 304. For instance, a first sensors 302(1) can capture image data representing a first passenger 306(1) within the vehicle 304, and a second sensor 302(2) can capture image data representing a second passenger 306(2) within the vehicle 304.

In some examples, the system 300 may include more or less sensors 302(1)-(2) for acquiring sensor data within the vehicle 304. For example, the system 300 may include one sensor that acquires sensor data representing the entire passenger compartment of the vehicle 304. For another example, the system 300 may include one or more sensors for each passenger seat within the vehicle 304. For instance, if the vehicle 304 includes six passenger seats, the system 300 may include one or more sensors for each of the six passenger seats within the vehicle 304, where each sensor acquires sensor data representing a respective passenger seat within the vehicle 304.

Figure 3B:
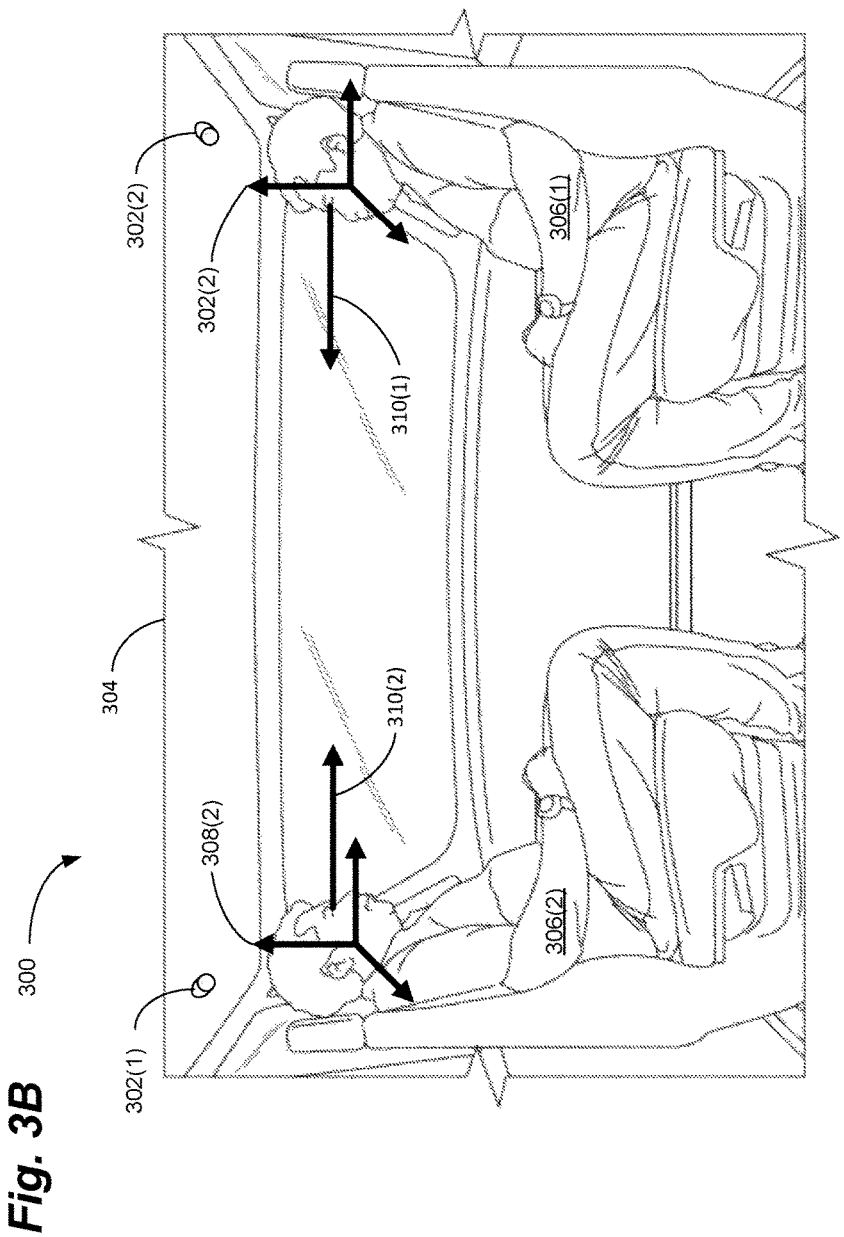
FIG. 3B depicts a first view of an example of a system analyzing data using pose estimation and gaze detection.
Figure 3C:
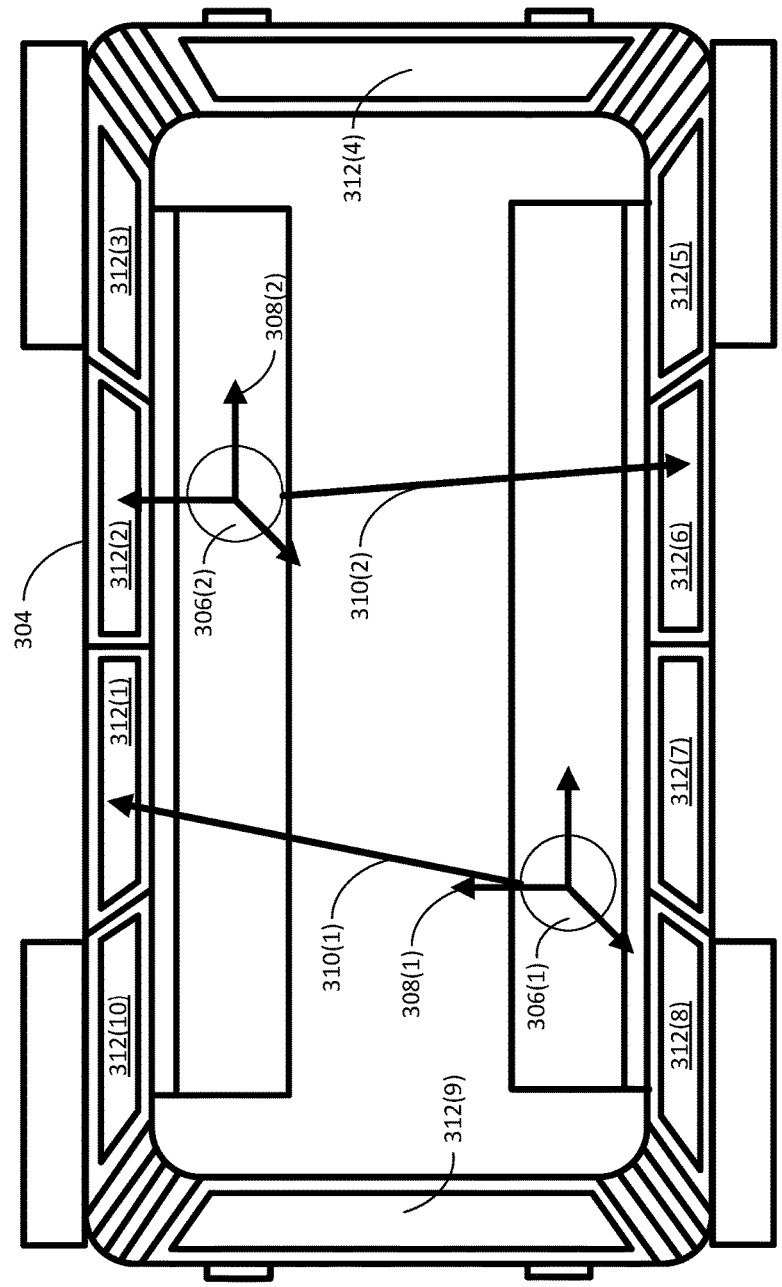
FIG. 3C depicts a second view of the example of the system analyzing data using pose estimation and gaze detection.

As illustrated by FIGS. 3B and 3C, using the sensor data from each of the sensors 302(1)-(2), the system 300 can perform pose estimation to determine a respective pose 308(1)-(2) of each of the passengers 306(1)-(2). The respective pose 308(1)-(2) of each of the passengers 306(1)-(2) can include the three dimensional location (e.g., (X,Y,Z) coordinates) and orientation of the head and/or the eyes of the respective passenger 306(1)-(2). The system 300 can then use the respective pose 308(1)-(2) of each of the passengers 306(1)-(2), as well as the sensor data, to perform gaze detection to determine a respective gaze direction 310(1)-(2) for each of the passengers 306(1)-(2). The respective gaze direction 310(1)-(2) for each of the passengers 306(1)-(2) can include the direction that the respective passenger 306(1)-(2) is looking within the vehicle 304.

For instance, the system 300 can analyze the sensor data from the first sensor 302(1) using one or more computer-vision algorithms associated with pose estimation to determine the three-dimensional location (e.g., (X,Y,Z) coordinates) and orientation of the head of the first passenger 306(1) within the vehicle 304, which is represented by the first pose 308(1). Additionally or alternatively, in some examples, the system 300 can analyze the sensor data from the first sensor 302(1) using one or more computer-vision algorithms associated with pose estimation to determine the three-dimensional location (e.g., (X,Y,Z) coordinates) and orientation of the eyes of the first passenger 306(1) with respect to the head of the first passenger 306(1). In either scenario, such coordinates may be provided in either a local coordinate reference frame (e.g. that of the vehicle) and/or a global coordinate reference frame.

The system 300 can further analyze the sensor data from the second sensor 302(2) using the one or more computer-vision algorithms associated with pose estimation to determine the three-dimensional location (e.g., (X,Y,Z) coordinates) and orientation of the head of the second passenger 306(2), which is represented by the second pose 308(2). Additionally or alternatively, in some examples, the system 300 can analyze the sensor data from the second sensor 302(2) using one or more computer-vision algorithms associated with pose estimation to determine the three-dimensional location (e.g., (X,Y,Z) coordinates) and orientation of the eyes of the second passenger 306(2) with respect to the head of the second passenger 306(2). As discussed above, when analyzing the sensor data using pose estimation, the system 300 can utilize one or more analytic methods, geometric methods, genetic algorithm methods, learning-based methods, or other type of pose estimation techniques to determine the respective poses 308(1)-(2) of each of the passengers 306(1)-(2) (e.g. one or more of a head pose and eye poses).

Additionally, the system 300 can analyze the sensor data from the first sensor 302(1) using one or more computer-vision algorithms associated with gaze detection (e.g., eye tracking) in order to determine a gaze direction 310(1) of the first passenger 306(1). For instance, in some examples, the system 300 can utilize the one or more computer-vision algorithms associated with gaze detection to analyze the sensor data from the first sensor 302(1) in order to detect the face of the first passenger 306(1), and, based on detecting the face, monitor the pupil of each of the eyes of the first passenger 306(1). While monitoring, the system 300 can calculate the direction in which the first passenger 306(1) is currently looking, which can correspond to the gaze direction 310(1) of the first passenger 306(1).

The system 300 can further analyze the sensor data from the second sensor 302(2) using the one or more computer-vision algorithms associated with gaze detection (e.g., eye tracking) in order to determine a gaze direction 310(2) of the second passenger 306(2). For instance, system 300 can utilize the one or more computer-vision algorithms associated with gaze detection to analyze the sensor data from the second sensor 302(2) in order to detect the face of the second passenger 306(2), and, based on detecting the face, monitor the pupil of each of the eyes of the second passenger 306(2). While monitoring, the system 300 can calculate the direction in which the second passenger 306(2) is currently looking, which can correspond to the gaze direction 310(2) of the second passenger 306(2). As discussed above, when analyzing the sensor data using gaze detection, the system 300 can utilize one or more video-based eye tracking techniques, infrared/near-infrared eye tracking techniques, bright-pupil tracking techniques, passive light tracking techniques, or the like.

Figure 3D:
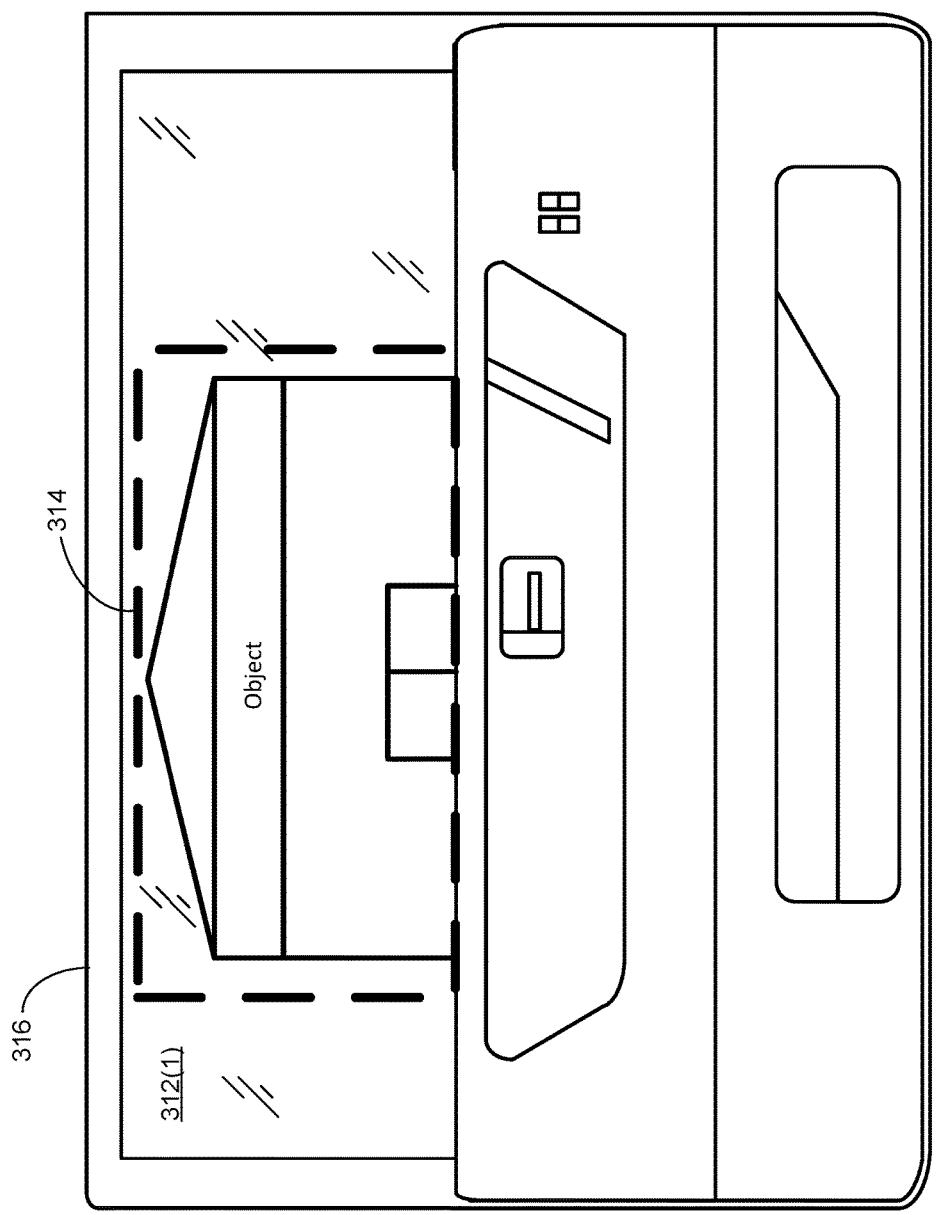
FIG. 3D depicts a system identifying a surface within a vehicle for providing content based on a pose and a point of gaze of a passenger.

Based on the respective pose 308(1)-(2) of the heads and/or eyes and gaze direction 310(1)-(2) of each of the passengers 306(1)-(2), the system 300 can identify surfaces 312(1)-(10) (e.g., translucent displays, such as windows) within the vehicle 304 for providing content. For instance, and using the first passenger 306(1) as an example, the system 300 can utilize one or more algorithms to calculate, based on both the pose 308(1) and the gaze direction 310(1) of the first passenger 306(1), a line of sight of the first passenger 306(1). The system 300 can then use the line of sight of the first passenger 306(1) to determine a region of interest 314 of the first passenger 306(1) within the vehicle 304. In some instances, the region of interest 314 can correspond to a focal point of the first passenger 306(1). As shown in the example of FIGS. 3C and 3D, the region of interest 314 of the first passenger 306(1) includes the first surface 312(1) of the left-rear door 316 of the vehicle 304. As such, the system 300 can determine that the surface for providing content to the first passenger 306(1) includes the first surface 312(1) of the vehicle 304. In some examples, the system 300 can perform a similar technique to determine that the surface for providing content to the second passenger 306(2) includes the sixth surface 312(6) of the vehicle 304.

In addition to determining the surface for providing the content, the system 300 further identifies the type of content to provide to the passengers 306(1)-(2). Content can include advertisements, videos (e.g., movies, television shows, etc.), text (e.g., books, news articles, etc.), games, educational material, music, images, or any other type of content that the system 300 can provide to the passengers 306(1)-(2). In some examples, the system 300 can identify general content (e.g., not location-based content) for the passengers 306(1)-(2). For instance the system 300 can utilize a respective profile that is associated with each of the passengers 306(1)-(2) to identify general content to provide to the passengers 306(1)-(2). The respective profile can include data indicating preferences of the passenger, such as the passenger's favorite television shows/movies, books, retail stores, restaurants, geographic locations, music, or the like.

Figure 8:
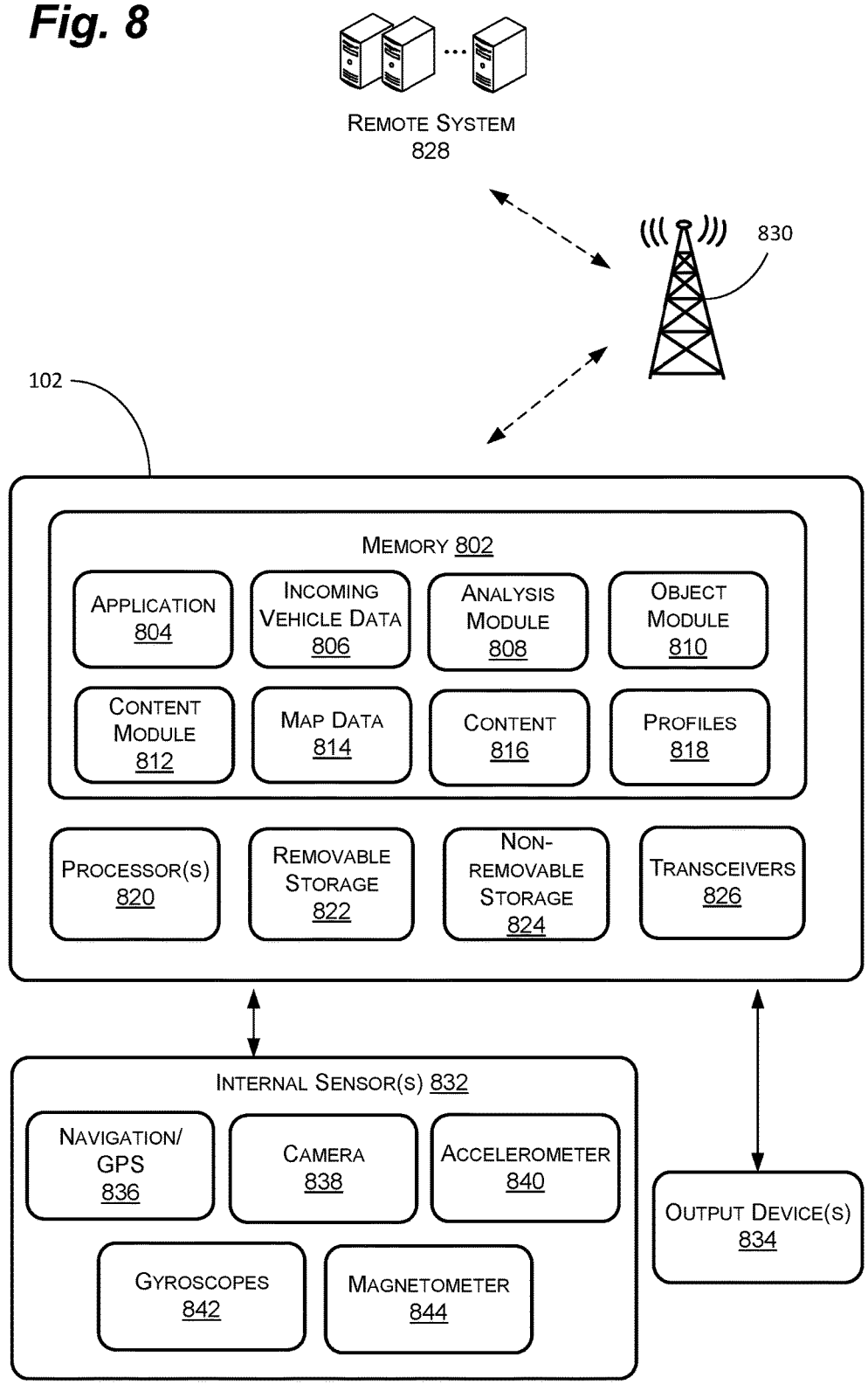
FIG. 8 is a component level schematic diagram of an example of an electronic device for use with the systems of FIGS. 1A-2B.

In some examples, the profiles may be stored on a remote system (e.g., remote system 828 from FIG. 8). In such examples, the system 300 can send a message to the remote system requesting content for one or more of the passengers 306(1)-(2), and then receive the content from the remote system. For instance, the remote system can receive the message from the system 300 and based on the message, identify each of the passengers 306(1)-(2) within the vehicle 304. In some instances, the remote system can identify the passengers 306(1)-(2) based on receiving a message, that identifies one or more of the passengers 306(1)-(2), from an electronic device of one of the passengers 306(1)-(2), such as when the respective passenger 306(1)-(2) uses the electronic device to request the vehicle 304. In some instances, the remote system can receive sensor data from the vehicle 304, and then analyze the sensor data using facial recognition (or any other biometric information available) to identify the passengers 306(1)-(2). Using the identify of the passengers 306(1)-(2), the remote system can then identify content for each passenger 306(1)-(2) using the respective profile of the passenger 306(1)-(2), and then send the content back to the system 300.

Additionally, or alternatively, in some examples, the system 300 can store profiles for the passenger 306(1)-(2) locally. In some instances, the system 300 receives the profiles from the remote system. For instance, the remote system may send the system 300 the profiles at a time that the remote system dispatches the vehicle 304 to pick up the passengers 306(1)-(2). The system 300 can then use the profiles to identify content for each of the passengers 306(1)-(2) using a similar process as above for the remote system.

Figure 4:
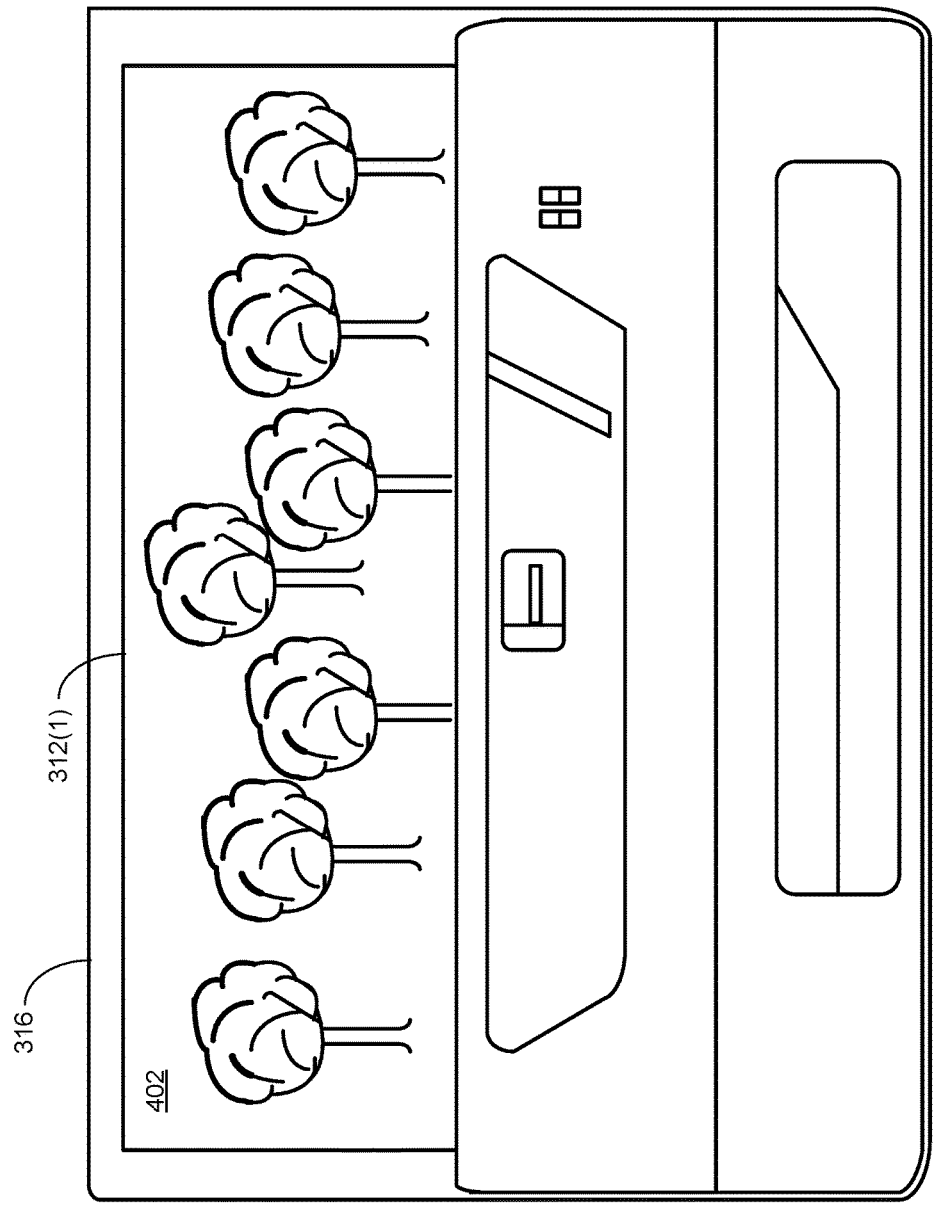
FIG. 4 depicts a system of providing a passenger within a vehicle with general content.

For instance, in the example of FIG. 4, and using the first passenger 306(1) as an example, the system 300 can utilize the profile associated with the first passenger 306(1) to determine that the first passenger 306(1) prefers country scenes rather than, for example, the cityscape that may be visible while the vehicle is moving through traffic in a city. Based on the determination, the system 300 can retrieve content 402 associated with a country scene, and provide the content 402 to the first passenger 306(1). For instance, the first surface 312(1) of the vehicle 304 may include a translucent display. To provide the content 402 to the first passenger 306(1), the system 300 can cause the first surface 312(1) to display the content 402. In some examples, as illustrated in FIG. 4, displaying the content 402 to the first passenger 306(1) causes the first surface 312(1) to no longer appear translucent to the first passenger 306(1), such that the vehicle 304 is providing the first passenger 306(1) with a virtual reality type experience.

In some examples, when providing the general content 402 to the first passenger 306(1), the system 300 can provide the content 402 based on a motion of the vehicle 304. For instance, the vehicle 304 can be equipped with accelerometers, speed sensors, gyroscopes, and other equipment that send sensor data to the system 300. The system 300 can then use the sensor data to determine a motion of the vehicle 304, such as a measured acceleration, speed, orientation (e.g., direction of travel, roll, pitch, yaw, etc.), and other characteristics of the vehicle 304. Using the motion, the system 300 can procedurally generate and provide the content 402 to the first passenger 306(1).

For instance, based on a speed of the vehicle 304, the system 300 can provide the content 402 to the first passenger 306(1) such that it appears to the first passenger 306(1) that the vehicle 304 is traveling through the scene. For instance, the trees within the scene may move at a specific speed from a right side of the surface 312(1) to the left side of the surface 312(1) such that it appears to the first passenger 306(1) that the vehicle 304 is driving through the country at the speed of the vehicle 304. Additionally, based on the speed of the vehicle 304 increasing and/or decreasing, the system 300 can change a specific speed in which the trees are moving from the right side of the surface 312(1) to the left side of the surface 312(1) such that the specific speed of the trees corresponds to the speed of the vehicle 304.

Additionally, in some instances, when providing general content 402 to the first passenger 306(1), the system 330 may augment an environment and/or one or more objects located outside of the vehicle 304 with the content 402. For instance, the system 304 can identify one or more objects that are proximate to the vehicle 304 using the techniques described herein. The vehicle 304 can then augment the one or more objects for the first passenger 306(1) using the general content 402. For instance, the system 300 can cause the first surface 312(1) to display the content 402 such that an object located outside of the vehicle 304 is augmented for the first passenger 306(1) using the content 402. For another example, the system 300 can cause a projector to project the content 402 on the first surface 306(1) in such a way that an object located outside of the vehicle 304 is augmented for the first passenger 306(1) using the content 402.

Figure 5A:
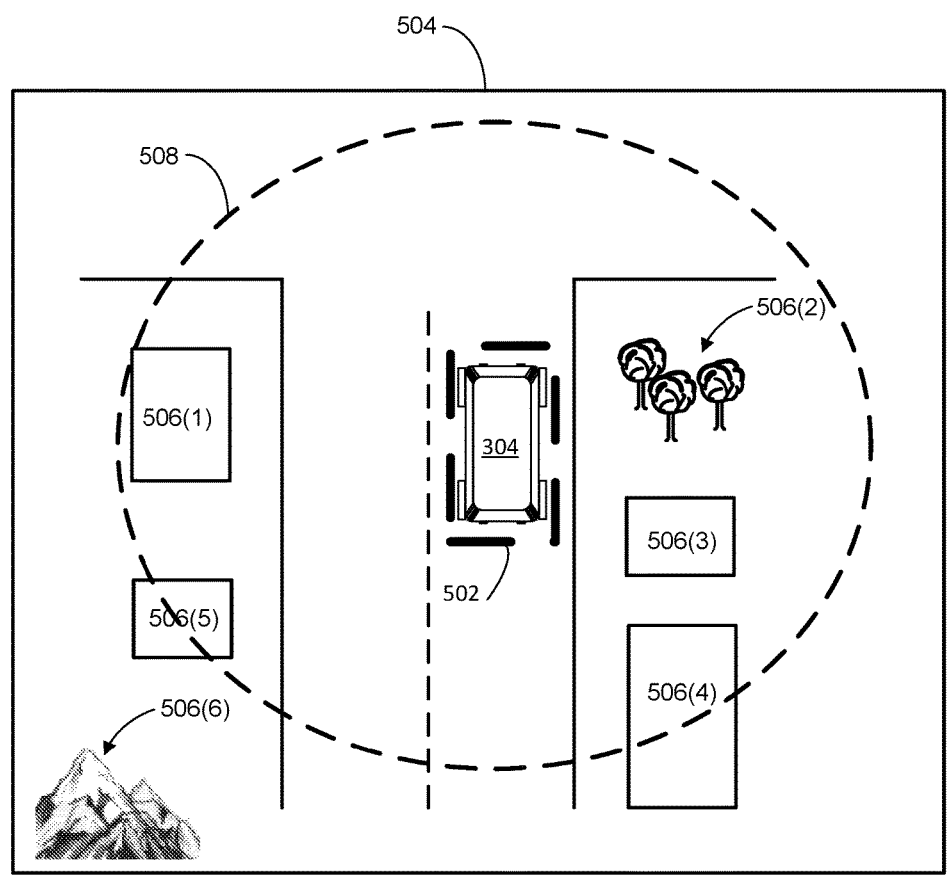
FIG. 5A depicts a schematic diagram of a system identifying objects that are within a predetermined distance of a vehicle.

In some examples, in addition to providing general content, the system 300 can provide the passengers 306(1)-(2) with location-based content that is based on a geographical location 502 of the vehicle 304. For instance, FIG. 5A depicts the system 300 mapping the geographical location 502 of the vehicle 304 to a geographical map 504. In some examples, to map the geographic location 502 to the geographic map 504, the system 300 first creates the geographical map 504 using map data that is associated with an area of operation of the vehicle 304. In some examples, the area of operation can include a geographical region, such as a county, city, state, or the like, that the vehicle 304 is programmed to operate within. The system 300 can then acquire sensor data from one or more sensors of the vehicle 304, where the sensor data indicates the geographic location 502 of the vehicle 304, and map the geographical location 502 to the geographical map 504.

Using the geographical map 504, the system 300 can then identify one or more objects 506(1)-(5) that are proximate to the vehicle 304. As discussed above, objects 506(1)-(6) can include both natural objects (e.g., trees 506(1) and mountains 506(6)) or man-made objects (e.g., structures 506(1), 506(3), 506(4), and 506(5)). In the example of FIG. 5A, the system 300 identifies the objects 506(1)-(5) that are within a predetermined distance 508 of the vehicle 304. For instance, the system 300 can identify objects 506(1)-(5) that are within one block, one hundred feet, one mile, or the like of the vehicle 304. In some examples, the system 300 can use a constant predetermined distance when identifying objects 506(1)-(5) while in other examples, the system 300 can use a varying predetermined distance.

For example, the system 300 can use a first distance when the vehicle 304 is located within a first area, such as out in the country, and use a second distance when the vehicle 304 is located with a second area, such as the city. For another example, the system 300 can use a first, longer distance, when the vehicle 304 is traveling through an environment that does not include many objects. Additionally, the system 300 can use a second, shorter distance, when the vehicle 304 is traveling through an environment that includes numerous objects.

In some instances, in addition to, or alternatively from, identifying objects 506(1)-(5) that are proximate to the vehicle 304, the system 300 can identify at least one object 506(6) that is outside of the predetermined distance 508 of the vehicle 304. For instance, the vehicle 304 can identify at least one object 506(6) that is further than one block, one hundred feet, one mile, or the like from the vehicle 304. As discussed above, in some examples, the system 300 can use a constant predetermined distance when identifying the at least one object 506(6) while, in other examples, the system 300 can use a varying predetermined distance. For instance, the system 300 can use a first distance when the vehicle 304 is located within a first area, such as out in the country, and use a second distance when the vehicle 304 is located with a second area, such as the city.

Figure 5B:
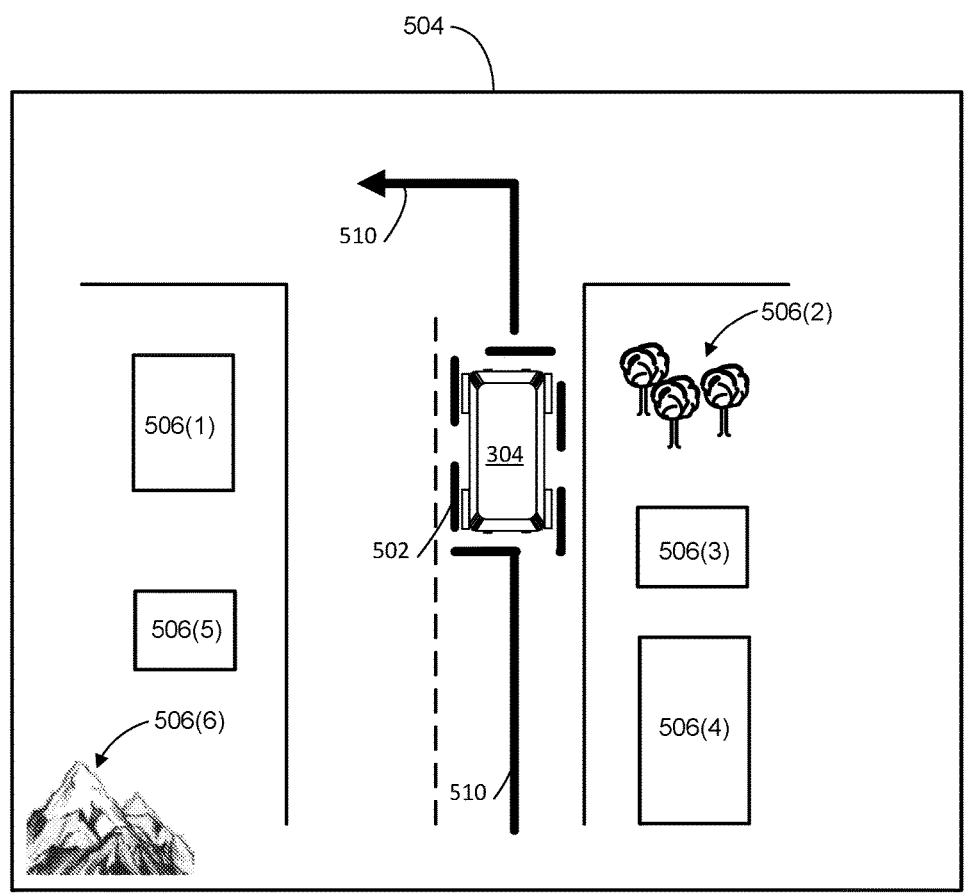
FIG. 5B depicts a schematic diagram of a system identifying objects that are along a projected route of a vehicle.

Additionally, or alternatively, and as illustrated in the example of FIG. 5B, the system 300 can identify objects 506(1)-(6) located along on a projected route 510 of the vehicle 304. For instance, the system 300 can acquire sensor data from one or more sensors of the vehicle 304. Such sensor data may indicate a direction of travel for the vehicle 304, a localization of the vehicle 304 in the environment (or map), as well as information about objects in the environment that may be extracted via one or more algorithms (e.g. object detection, segmentation, classification). In some instances, the sensor data can include both a current geographical location (position and/or orientation) of the vehicle 304 and a geographical location associated with a destination in which the vehicle 304 is traveling. The system 300 can then use the sensor data to map a projected route 510 for the vehicle 304. Using the geographical map, the system 300 can then identify objects 506(1)-(6) that are located along the projected route 510 of the vehicle 304. In some examples, when the projected route 510 of the vehicle 304 may change based on traffic conditions or other factors, the system 300 can continually use the sensor data to track a new projected route for the vehicle 304. The system 300 can then identify new objects based on the new projected route, in conjunction with continually updated sensor data.

Figure 5C:
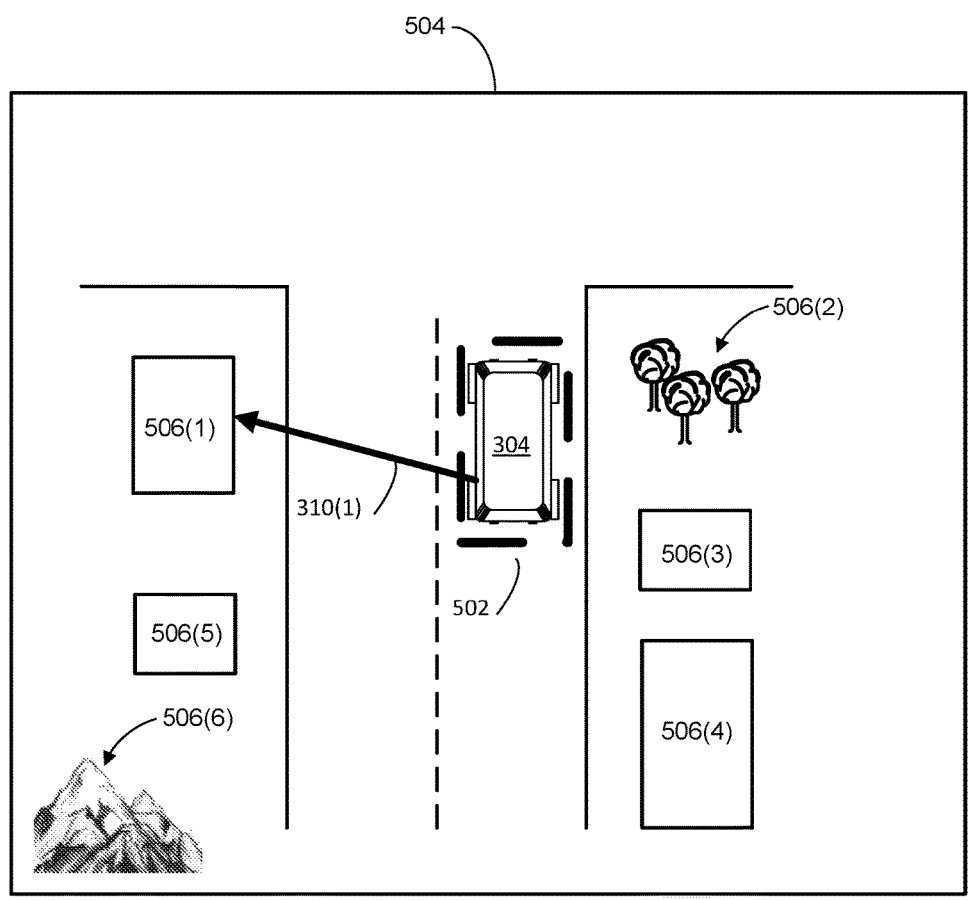
FIG. 5C depicts a schematic diagram of a system identifying an object of interest.

Additionally, or alternatively, and as illustrated in FIG. 5C, the system 300 can identify a respective object of interest for each of the passengers 306(1)-(2). For instance, and using the first passenger 306(1) as an example, the system 300 can determine that a region of interest 314 of the first passenger 306(1) corresponds to the first surface 312(1) of the vehicle 304. Using that determination, the system 300 can identify one or more of objects of interest 506(1) that are within the line of sight of the first passenger 306(1) through the first surface 312(1). For instance, the system 300 can use the map data and/or sensor data from any one or more of the vehicle sensors to identify objects 506(1) that are located outside of the vehicle 304 and not obscured by other objects. In some examples, the system 300 identifies the object of interest 506(1) from the objects 506(1)-(5) that the system 300 identified using the predetermined distance 508. In some examples, the system 300 identifies the object of interest 506(1) from the objects 506(1)-(6) that the system 300 identified using the projected route 510 of the vehicle 304.

Using one or more identified objects 506(1)-(6) (and/or the object of interest 506(1)), the system 300 can identify content to present to each of the passengers 306(1)-(2). For instance, in some examples, and using the first passenger 306(1) as an example, the system 300 can identify content that is associated with the object of interest 506(1). Content associated with the object of interest 506(1) can include advertisements relevant to the object of interest 506(1) (e.g., advertisements for goods and/or services provided by the object of interest 506(1)), information describing the object of interest 506(1), graphical objects that represent the object of interest 506(1) (e.g., logos, trademarks, etc.), or the like. The system 300 can then provide the content to the first passenger 306(1).

Figure 6B:
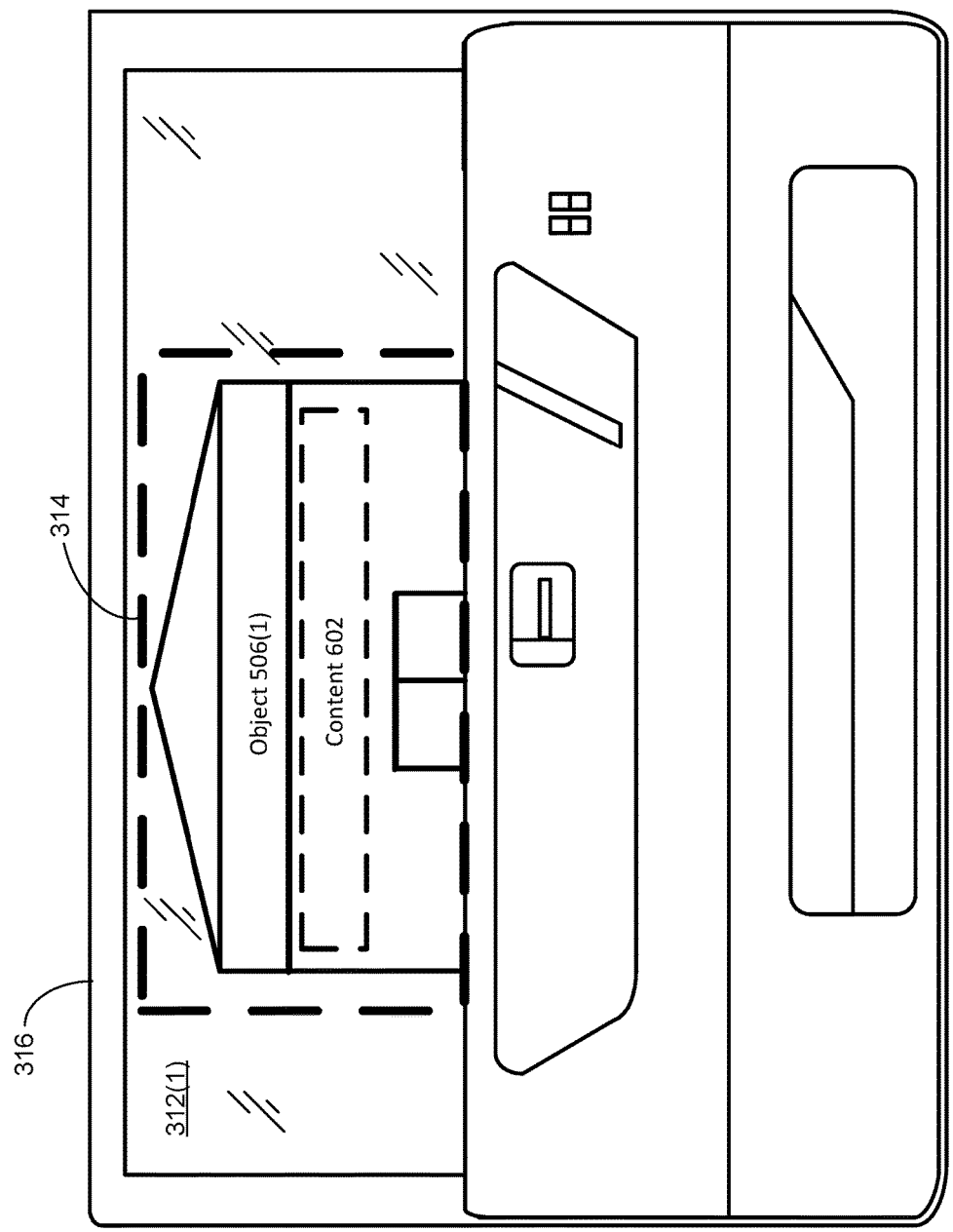
FIG. 6B depicts a second example of the system providing location-based content within a vehicle.

FIGS. 6A-6B depict the system 300 providing content to passengers based on a location of the vehicle 304. In some instances, providing the content can include causing the first surface 312(1), which, as discussed above, may include a translucent display, to augment an object 506(1) with content 602. In some instances, the content 602 can include general content that is identified for the passengers. Additionally, or alternatively, in some instances, the content 602 can include location-based content that is identified for the passengers.

As shown by the example of FIG. 6A, the system 300 can cause the first surface 312(1) to merely display the content 602 at a given location 604 on the first surface 312(1). In some examples, the system 300 may select the same location 604 for all content that is presented using the first surface 312(1). In some examples, the system 300 may select different locations based on a type of content that is being presented and/or a type of object that the system 300 is augmenting with the content 602.

For example, the system 300 can cause the first surface 312(1) to display content associated with advertisements at a first location of the first surface 312(1), and display content associated with information describing an object at a second location of the first surface 312(1). For another example, the system 300 can cause the first surface 312(1) to display content associated with a restaurant (and/or other type of merchant) at a first location of the first surface 312(1), such as a corner location so that the content does not block the first passenger's 306(1) field of view of the restaurant, and cause the first surface 312(1) the display content associated with a city block at a second location of the first surface 312(1), such as in the middle, so that the first passenger 306(1) can view the content while looking at the city.

In some examples, rather than selecting a designated location for the content 602, the system 300 can determine a location for presented the content 602 based on a line of sight of the first passenger 306(1). For instance, and as illustrated in FIG. 6B, the system 300 can determine that the region of interest 314 of the first passenger 306(1) includes a portion of the first surface 312(1) using the determined line of sight and/or a relative position of the object to the passenger. Additionally, using the line of sight, the system 300 can determine that the region of interest 314 of the first passenger 306(1) corresponds to the object of interest 506(1) (i.e., that the first passenger 306(1) is looking at the object of interest 506(1)). For instance, the system 300 can determine that the first passenger 306(1) is focusing on the object of interest 506(1) through the first surface 312(1) using the line of sight of the first passenger 306(1) and the map data described above. Based on the determination, the system 300 can determine a location for presenting the content 602 such that the object of interest 506(1) is augmented with the content 602.

For instance, the system 300 can cause the first surface 312(1) to display the content 602 within the portion of the first surface 312(1) such that the object of interest 506(1) is augmented with the content 602. In some examples, to augment the object of interest 506(1), the system 300 may first identify a layout for the object of interest 506(1) using one or more of the map data or the sensor data. Using the layout, the system 300 may determine a specific location within the portion of the first surface 312(1) for presenting the content 602. For instance, if the system 300 determines that the object of interest 506(1) includes a billboard, sign, and/or other surface for presenting content, such as advertisements to passengers of vehicles, the system 300 may cause the first surface 312(1) to display the content 602 at a specific location that causes it to appear as if the content 602 is part of the billboard, sign, and/or other surface for the first passenger 306(1).

In some examples, when content 602 is used to augment the environment, the object of interest 506(1) within the environment, or otherwise, the content 602 may be transformed, such as by some projective geometry, to create the illusion to the first passenger 506(1) that the content 602 was naturally appearing in the environment or on the object of interest 506(1). In some instances, the transformation may be based, at least in part, on the pose 308(1) of the first passenger 306(1), the gaze direction 310(1) of the first passenger 306(1), a location of the object of interest 506(1) relative to the first passenger 306(1), a geometry of the object of interest 506(1), and/or the like. For instance, the system 300 can transform a size, an orientation, a color, a texture, and/or the like of the content 602 based on the pose 308(1) of the first passenger 306(1), the gaze direction 310(1) of the first passenger 306(1), a location of the object of interest 506(1) relative to the first passenger 306(1), a geometry of the object of interest 506(1), and/or the like. The system 300 can then augment the environment and/or the object of interest 506(1) using the transformed content 602.

For example, if the object of interest 506(1) is located far from the vehicle 304 and/or the first passenger 306(1) within the vehicle 304, the system 300 can transform the content 602 such that it appears to the first passenger 306(1) as if the content 602 is naturally appearing on the object of interest 506(1). For instance, in the example, since the relative size of the object of interest 506(1) may look small to the first passenger 506(1) based on the location of the object of interest 506(1) relative to the first passenger 506(1), the system 300 may reduce the size of the content 602 such that the content 602 is naturally appearing on the object of interest 506(1) for the first passenger 306(1). For another example, as the vehicle 304 moves closer to the object of interest 506(1), thus causing the vehicle 304 and/or the first passenger 306(1) to get closer to the object of interest 506(1), the relative size of the object of interest 506(1) may increase for the first passenger 306(1). As such, the system 300 may continuously increase the size of the content 602 such that it continues to naturally appear on the object of interest 506(1) for the first passenger 306(1).

It should further be noted that, in some instances, the system 300 can augment one or more objects 506(1)-(6) within the environment with general content (e.g., not location-based content). For instance, the system 300 can cause the first surface 312(1) to display general content within the portion of the first surface 312(1) such that the object of interest 506(1) is augmented with the general content. As with location-based content, in some examples, to augment the object of interest 506(1), the system 300 may first identify a layout for the object of interest 506(1) using the map data. Using the layout, the system 300 may determine a specific location within the portion of the first surface 312(1) for presenting the general content. For instance, if the system 300 determines that the object of interest 506(1) includes a billboard, sign, and/or other surface for presenting content, such as advertisements to passengers of vehicles, the system 300 may cause the first surface 312(1) to display the general content at a specific location that causes it to appear as if the general content is part of the billboard, sign, and/or other surface for the first passenger 306(1).

Additionally, it should be noted that, although the examples of FIGS. 5A-6B describe displaying the content (e.g., general content, location-based content, etc.) using the first surface 312(1), the system 300 may additionally display the content using other techniques. For instance, in some examples, the system 300 may include a projector that can project the content to the passenger 306(1) on the first surface 312(1) such that the object of interest 506(1) is augmented with the content. In some examples, the system 300 can include a projector that can project the content on the object of interest 506(1). For instance, when the object of interest 506(1) includes a billboard, sign, and/or some other surface for presenting content, the system 300 may cause the content to be projected on the billboard, sign, and/or other surface. By projecting the content on the object of interest 506(1), the system 330 can provide the passenger 306(1) with an augmented reality experience.

Figure 7:
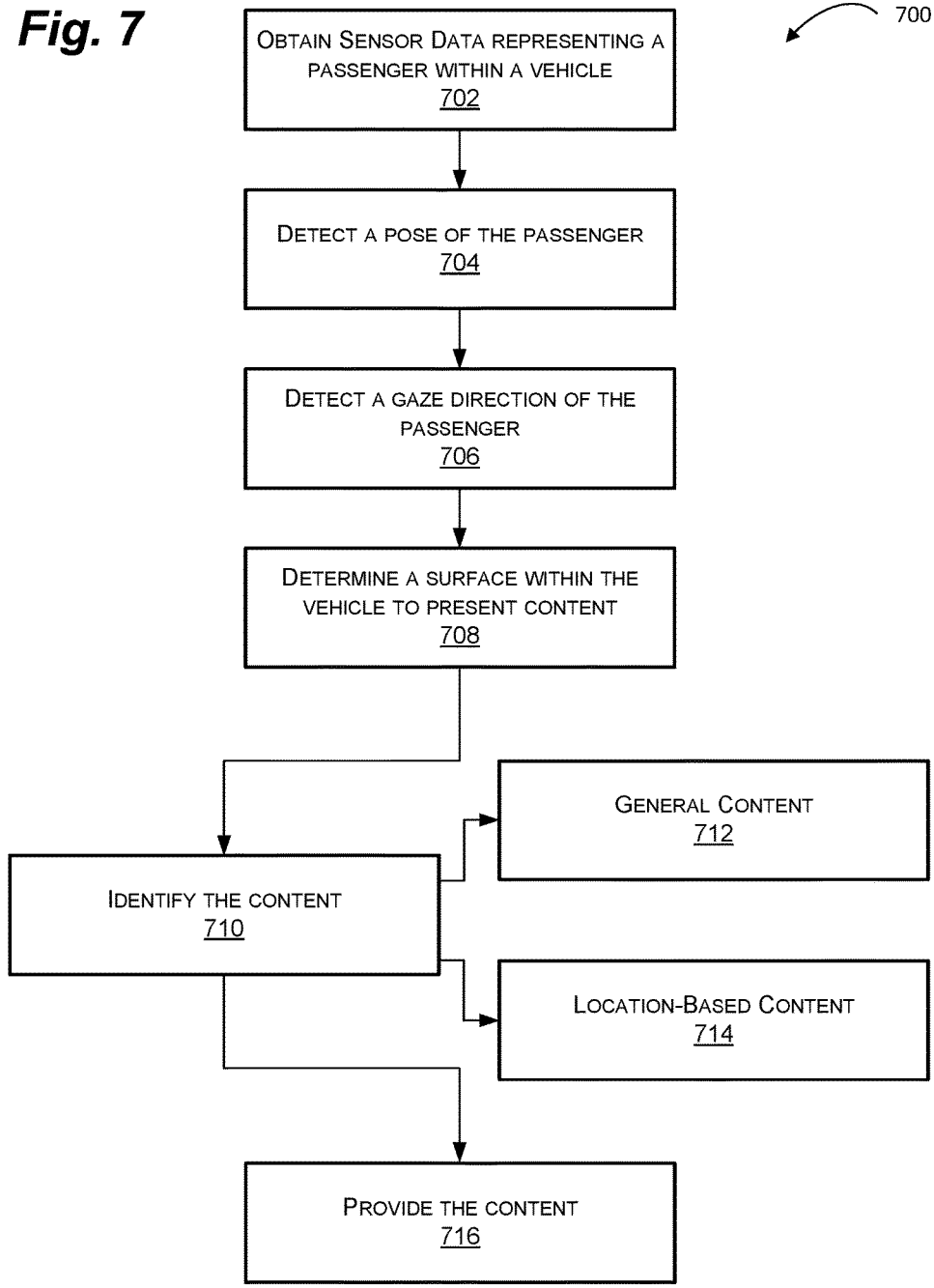
FIG. 7 is a flowchart depicting an example of a process for providing content within a vehicle.

To illustrate the examples describes above, FIG. 7 is a flowchart depicting an example of a process 700 for providing a passenger within a vehicle with content, in accordance with some examples of the present disclosure. The process 700, as well as each process described herein, is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Additionally, one or more of the described blocks can be optional, such that the blocks can be omitted from the process. The processes may be performed, in some instances, by a system within the vehicle itself, by a remote system, or by any combination thereof.

At 702, the system obtains sensor data representing a passenger within a vehicle. For instance, the system can obtain image data from one or more cameras located within the vehicle, where the image data represents the passenger within the vehicle. In some examples, obtaining the image data can include capturing the image data using one or more cameras of the system. In some examples, obtaining the image data can include receiving the image data from the vehicle via a network communication.

At 704, the system detects a pose of the passenger. For instance, the system can analyze the sensor data using one or more computer-vision algorithms associated with pose estimation to detect a pose of a head of the passenger within the vehicle. In some examples, the pose of the head of the passenger includes the three-dimensional location and orientation of the head of the passenger within the vehicle, i.e. relative to a vehicle coordinate reference frame and/or a global reference frame. Additionally, or alternatively, in some instances, the system can analyze the sensor data using the one or more computer-vision algorithms associated with pose estimation to detect a post of the eyes of the passenger. In some examples, the pose of the eyes of the passenger can include the three-dimensional location and orientation of the eyes of the passenger within the vehicle, i.e. relative to a vehicle coordinate reference frame and/or a global reference frame. In some examples, the system can continuously receive image data in order to track the pose of the passenger while the passenger is within the vehicle.

At 706, the system detects a gaze direction of the passenger. For instance, the system can analyze the sensor data using one or more computer-vision algorithms associated with gaze detection to detect a gaze direction of the passenger. In some examples, the gaze direction corresponds the direction in which the passenger is currently looking within the vehicle. For instance, in some examples, and using the pose of the head and/or eyes of the passenger, the system can utilize the one or more computer-vision algorithms to analyze the sensor data in order to detect the face of the passenger, and, based on detecting the face, monitor the pupil of each of the eyes of the passenger. While monitoring, the system can calculate the direction in which the passenger is currently looking within the vehicle. In some examples, the system can continuously receive sensor data in order to track the point of gaze of the passenger within the vehicle.

At 708, the system determines a surface within the vehicle to present content. For instance, the system can use the pose of the passenger and the gaze direction of the passenger to determine a line of sight of the passenger, and then use the line of sight to determine a region of interest within the vehicle for the passenger. Additionally, or in the alternative, sensor data from the vehicle can be used to determine a pose of the vehicle within an environment such as by using SLAM, a Kalman filter, particle filters, bundle adjustment, or the like. At least a portion of the sensor data may also be used to determine objects (e.g. through recognition, detection, and/or classification), as well as their respective poses relative to a vehicle coordinate system and/or global coordinate system. In some examples, such objects may be predetermined based on map data associated such that information about the size, location, and/or orientation may be available by map query. In some examples, the region of interest corresponds to the location within the vehicle at which the passenger is looking. The system can then determine a surface to present content based on the region of interest. For example, if the region of interest includes a translucent display of the vehicle, such as a window, the system can determine that the surface includes the translucent display. For another example, if the region of interest includes a different surface of the vehicle, such as the front dash, the system can determine to present content at the respective surface.

At 710, the system identifies the content. As discussed above, content can include advertisements, videos (e.g., movies, television shows, etc.), text (e.g., books, news articles, etc.), games, educational material, music, images, or any other type of content that the system can provide to the passenger within the vehicle. In some examples, the vehicle determines whether to provide the passenger with general content or location-based content. For example, the system may receive a message from a device of the passenger to present general content, such as a movie, book, or the like. Based on the message, the system can determine to provide the passenger with general content. For another example, the system can determine, using the region of interest of the passenger and map data, that the passenger is focusing on an object located within the environment outside of the vehicle. Based on the determination, the system can determine to provide the passenger with location-based content associated with the object.

For instance, if the system determines to provide general content, at 712, the system identifies general content for the passenger. For instance, in some examples, the system can utilize a profile associated with the passenger to identify the content. As discussed above, the profile can include data indicating preferences of the passenger, such as the passenger's favorite television shows/movies, books, retail stores, restaurants, geographic locations, music, or the like. In some instances, to identify the content using the profile, the system can receive a message from an electronic device of the passenger identifying a type of content. For instance, the message can indicate that the passenger wants to watch a movie. Additionally, or alternatively, in some instances, the system can identify the type of content based on analyzing speech that is captured from the passenger. For instance, the system can generate an audio signal that represents speech from the passenger using one or more microphones within the vehicle, and then analyze the audio signal using one or more speech recognition techniques to identify a type of content that the passenger prefers based on the speech of the passenger. For instance, the speech can indicate that the passenger wants to watch a movie. Based on the type of content, and the profile of the passenger, the system can then identify the content for the passenger (e.g., select the passenger's favorite movie).

In some examples, the system can identify the content by receiving the content from the electronic device of the passenger. For instance, the system can receive data associated with the content from the electronic device of the passenger. In some examples, the system automatically receives the data based on the electronic device entering the vehicle and/or based on the electronic device being within a threshold distance of the vehicle (e.g., one foot, ten feet, etc.). In some examples, the passenger manually causes the electronic device to send the data to the system. For instance, the electronic device can receive input indicating the type of content, and send the system data associated with the content in response to the input.

Additionally, or alternatively, if the system determines to provide location-based content, at 714, the system identifies location-based content for the passenger. For instance, the system may include components, such as a GPS receiver and/or other location-based component, that the system uses to determine the geographical location of the vehicle. Additionally, or in the alternative, at least a portion of the sensor data from one or more sensors may be used to localize (e.g. provide a position and/or orientation) the vehicle in a map. Such localization may be performed by any number of algorithms, including, but not limited to, Kalman filters, particle filters, SLAM, and bundle adjustment. In some examples, the system may continuously acquire sensor data from the components to track the geographical location of the vehicle. In some examples the system may acquire the sensor data from the components based a determination to provide the location-based content.

The system then identifies the content based, at least in part, on the geographical location. For instance, the system can use map data associated with a geographical region that includes the geographical location of the vehicle. The system can then use the map data (and or at least a portion of the sensor data as described above) to identify one or more objects that are proximate to the vehicle. In some examples, the system identifies one or more objects that are within a predetermined distance of the vehicle, such as one hundred feet, one block, one mile, or the like. In some examples, the system identifies one or more objects that are located along a projected route of the vehicle. For instance, the system can use the sensor data from the components to determine a projected route of the vehicle through the geographical region. The system can then use the projected route, along with the current geographical location of the vehicle, to identify one or more objects that are proximate to the vehicle and along the projected route. Additionally, or in the alternative, sensor data which is continually acquired may be used to recognize and/or detect objects in an environment, as well as provide additional information about the objects, such as a classification, a size, position and/or orientation, as well as other information about the object.

In some examples, the system can use the pose and the gaze direction of the passenger to identify an object of interest for the passenger. Such representations may be relative to some global coordinate system, relative to the vehicle, or relative to an object. Importantly, by knowing the location of the vehicle in an environment, one or more objects in the environment, and the passenger within the car, a representation may be calculated which relates the gaze direction and/or passenger pose to a particular object. For example, based on the region of interest of the passenger including a location on a translucent display of the vehicle, the system can identify an object of interest based on the respective object being visible to the passenger through the window. Such visibility may be determined, for example, based on occlusion prediction, object segmentation, classification, and the like. For another example, the system can use the map data to determine that the region of interest of the passenger includes the object of interest. For instance, the system can track the line of sight of the passenger to the respective object using each of the pose of the passenger, the point of gaze of the passenger, and the map data.

After identifying one or the objects, such as an object of interest, the system can identify content that is associated with the object. For instance, the system can identify advertisements that are relevant to the object (e.g., advertisements for goods and/or services provided by the object), information describing the object, graphical objects that represent the object (e.g., logos, trademarks, etc.), or the like. In some examples, the system identifies the content using a profile associated with the object. For instance, the system can store a database of profiles associated with various objects, where each profile includes content associated with a respective object. The system can then identify the profile associated with the object using an identity of the object (which the system may determine from the map data and/or some other sensor data), and identify content using the profile.

In some instances, the system can use speech from the passenger to identify the location-based content. For instance, as discussed above, the system can generate an audio signal that represents the speech of the user. The system can then analyze the audio signal using one or more speech recognition techniques to identify a type of content that the passenger wants the system to provide. For instance, the system may analyze the audio data to determine that the passenger requests "a food menu for the restaurant that I am looking at." The system can then use the profile associated with the identified object of interest (e.g., the restaurant in this example) to retrieve a food menu for the object of interest.

At 716, the system provides the content. For instance, if the surface includes a translucent display of the vehicle, such as a window, the system can cause the translucent display to display the content to the passenger. In some examples, displaying the content can include causing the translucent display to augment the outside environment for the passenger using the content. In some examples, displaying the content can include causing the translucent display to augment the identified object using the content. For instance, the system can identify a portion of the window in which the object is visible to the passenger using the region of interest of the passenger. The system can then cause the translucent display to display the content within the portion.

In some examples, rather than augmenting the outside environment with the content, the system can cause the translucent display to display the content in such a way that the outside environment is no longer visible to the passenger. For instance, the system can cause the entire translucent display to display content such that the translucent display is no longer translucent to the passenger. In some examples, the system can cause one or more additional translucent displays to display similar content. For instance, if the content includes a selected environment that the passenger prefers, such as a country scene, the system can cause each of the translucent displays to display content associated with a country scene such that the passenger feels like he/she is driving the country.

In some examples, the system can continuously repeat the method above when providing content to the passenger. For instance, the system can continuously receive sensor data, analyze the sensor data to determine a pose and a gaze direction of the passenger, determine a surface based on the pose and the gaze direction, identify general and/or location-based content, and provide the content using the surface. In some examples, while continuously repeating the method, the system may identify a new surface based on the pose and/or the gaze direction of the passenger and as such, may provide the content using the newly determined surface. As such, the passenger can continuously be provided with content associated with objects located within the environment outside of the vehicle even when the passenger keeps changing his/her focus.

Additionally, in some example, while repeating the method above, the system can identify a new object for providing location-based content to the passenger. For instance, as the vehicle is in motion, the system can determine a new geographical location of the vehicle. The system can then use map data associated with a geographical region that includes the new geographical location of the vehicle to identify at least one new object that is proximate to the vehicle, in conjunction with any additional sensor data used to identify objects. In some examples, the system identifies the new object based on the new object being within a predetermined distance of the vehicle, such as one hundred feet, one block, one mile, or the like. In some examples, the system identifies the new object based on the new object being located along a projected route of the vehicle. In either example, the system can then identify new content associated with the new object, and provide the new content to the passenger using the surface and/or a new surface of the vehicle.

It some examples, the system can further perform a similar method for one or more additional passengers within the vehicle. For instance, the system can receive sensor data representing a second passenger, analyze the sensor data to determine a pose and a gaze direction of the second passenger, determine a surface based on the pose and the gaze direction of the second passenger, identify general and/or location-based content for the second passenger, and the provide the content to the second passenger using the determined surface. In some instances, the determined surface and/or content of the first passenger may be similar to the determined surface and/or content of the second passenger. In some instances, the determined surface and/or content of the first passenger may differ from the determined surface and/or content of the second passenger.

FIG. 8 is a component level schematic view of a controller 102 for use with the system 100 (and similarly with use of the system 200 and the system 330) and methods described herein. The controller 102 can comprise a dedicated electronic device, such as a dedicated microcontroller, or can be a cell phone, smart phone, laptop, tablet, or other electronic devices that comprise a number of components to gather data and provide content based on the data.

The controller 102 can comprise memory 802 configured to include computer-executable instructions including at least an application 804, the incoming vehicle data 806, the analysis module 808, the object module 810, the content module 812, map data 814, content 816, and profiles 818. The controller 102 can also include one or more processor(s) 820, removable storage 822, non-removable storage 824, and transceiver(s) 826. Of course, in some examples, rather than being located in the controller 102, the application 804, the analysis module 808, the object module 810, the content module 812, map data 814, content 816, and profiles 818, or portions thereof, can be located on a remote system 828, on the passenger's electronic device, or in another component of the system 100.

In various examples, the memory 802 can be volatile (such as random access memory, or RAM), non-volatile (such as read only memory, or ROM, flash memory, etc.), or some combination of the two. The memory 802 can also comprise the application 804. As discussed herein, the application 804 receives sensor data, from either internal 832 or external 108 sensors, and can provide the passenger with content 816. In some examples, the application 804 can also gather the desired incoming vehicle data 806 from the various internal sensors 832 of the controller 102. This may be useful in autonomous systems, for example, to track control inputs to improve smoothness, routing, or efficiency, for example, and improve passenger comfort.

In some examples, the application 804 can stream incoming vehicle data 806 in its raw form to the remote system 828 via a network connection, such as over one or more cell towers 830. In other examples, the application 804 can package the incoming vehicle data 806 (e.g., using message session relay protocol (MSRP) packets, hypertext transfer protocol (HTTP) files, etc.) to be sent to the remote system 828 for analysis. For use with an autonomous taxi system, for example, the system 100 may incorporate the remote system 828 for controlling and updating the taxies in response to received incoming vehicle data 806 to improve maneuvering or object avoidance, among other things. In this configuration, the controller 102 may provide incoming vehicle data 806 updates to the remote system 828 to facilitate software updates for the taxies. In some examples, the system 100 may send the remote service 832 the incoming vehicle data 806 for analysis, and then receive both the content 816 and data indicating a surface for providing the content 816 from the remote service 832 in response.

In some examples, the application 804 can stream the incoming vehicle data 806 to the remote system 828 in real-time, or near real-time. In other examples, the application 804 can compile and store the incoming vehicle data 806 in the memory 802 and send periodic updates, or data packages. The application 804 can use the transceiver(s) 826 directly via a radio interface layer (RIL), or other controller, to send the incoming vehicle data 806 to the remote system 828 via the one or more cell towers 830.

In some examples, the memory 802 can also store the incoming vehicle data 806. The incoming vehicle data 806 can include the data provided by the external sensors 108 on the vehicle, or by internal sensor(s) 832 mounted on, or near, the controller 102. As discussed herein, the incoming vehicle data 806 can include video and still images, GPS coordinates, accelerometer readings, etc. The incoming vehicle data 806 can enable the controller 102 to determine when, and how, the content 816 is to be provided to the passenger. As discussed above, this can include selecting various surfaces within the vehicle for providing the content 816. This can also include selecting a type of content 816 to provide.

In some examples, the memory 802 can also include an analysis module 808 for analyzing the incoming vehicle data 806 using pose estimation and gaze detection. For instance, the analysis module 808 can analyze the incoming vehicle data 806, such as image data that represents the passenger within the vehicle, using one or more computer-vision algorithms associated with pose estimation to determine a pose of the head and/or the eyes of the passenger within the vehicle. Additionally, the analysis module 808 can analyze the incoming vehicle data 806 using one or more computer-vision algorithms associated with gaze detection to determine a gaze direction of the passenger. Furthermore, using the pose and the gaze direction, the analysis module 808 can utilize one or more algorithms to identify a surface, such as one of the translucent displays of the vehicle, for providing the content 816. For instance, the analysis module 808 can use one or more algorithms to identify a line of sight of the passenger based on the pose and the point of gaze, and then identify that a region of interest for the passenger includes the surface using the line of sight.

In some examples, the memory 802 can also include an object module 810 for identifying one or more objects that are proximate to the vehicle. For instance, the object module 810 can analyze the incoming vehicle data 806 to determine a geographical location of the vehicle. The object module 810 can then use the map data 814 to identify objects that are proximate to the vehicle based on the geographical location. In some examples, the object module 810 identifies objects that are within a predetermined distance of the vehicle. Additionally, or alternatively, in some examples, the object module 810 identifies objects that are along a projected route of the vehicle. For instance, the object module 810 can use the incoming vehicle data 806, such as direction data, speed data, or the like, to identify a projected route of the vehicle. The object module 810 can then identify objects that are along the projected route.

In some examples, the object module 810 can further identify one or more objects of interest for the passenger. For instance, the object module 810 can determine that the passenger is looking through a translucent display at the outside environment based on the pose and point of gaze of the passenger. The object module 810 can then identify an object of the one or more identified objects that is visible to the passenger through the translucent display. In some examples, rather than merely determining that the object is visible to the passenger, the object module 810 further identifies that the passenger is focusing on the object. For instance, the object module 810 can determine that a line of sight of the passenger is directed at the object.

In some examples, the memory 802 further includes a content module 812 for identifying content 816 for the passenger. As discussed herein, content can include general content or location-based content. To identify general content 816, the object module 810 may receive a message, such as from the device of the passenger, the remote system 828, or some other electronic device, that indicates the content 816 to be provided. Additionally, to identify general content 816, the object module 810 can use one of the profiles 818 that is associated with the passenger. As discussed above, a profile 818 can include data indicating preferences of the passenger, such as the passenger's favorite television shows/movies, books, retail stores, restaurants, geographic locations, music, or the like.

For location-based content 816, the content module 812 can identify content 816 that is associated with one or more identified objects. For instance, and using an object of interest as an example, the content module 812 can identify advertisements relevant to the object of interest (e.g., advertisements for goods and/or services provided by the object of interest), information describing the object of interest, graphical objects that represent the object of interest (e.g., logos, trademarks, etc.), or the like. In some examples, to identify the content, the content module 812 may use a profile 818 associated with the object of interest, wherein the profile indicates content 816 that is associated with the object of interest. For instance, the content module 812 may identify the object of interest using the map data 814, identify the profile 818 using the identity of the object of the interest, and then identify the content 816 using the profile 818.

In some examples, the processor(s) 820 can comprise a central processing unit (CPU), a graphics processing unit (GPU), or both a CPU and a GPU, or any other sort of processing unit. The processor(s) 820 can be responsible for running software on the controller 102, including the application 804, the analysis module 808, the object module 810, and the content module 812, and to interpret and send messages to the central server, if applicable. In some examples, the processor(s) 820 can also perform calculations and provide instructions based on the various external sensors 108, internal sensor(s) 832 and output device(s) 834.

The controller 102 can also include additional data storage devices (removable and/or non-removable) such as, for example, magnetic disks, optical disks, or tape. Such additional storage is illustrated in FIG. 8 by removable storage 822 and non-removable storage 824. The removable storage 822 and non-removable storage 824 can store the various modules, programs, and algorithms for the application 804, navigation, data gathering, and marketing processes and can include routines for receiving and scheduling routes, among other things.

Non-transitory computer-readable media may include volatile and nonvolatile, removable and non-removable tangible, physical media implemented in technology for storage of information, such as computer readable instructions, data structures, program modules, or other data. The memory 802, removable storage 822, and non-removable storage 824 are all examples of non-transitory computer-readable media. Non-transitory computer-readable media include, but are not limited to, RAM, ROM, electronically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the controller 102. Any such non-transitory computer-readable media may be part of the controller 102 or may be a separate device (e.g., a jump drive) or a separate database or databank (e.g. at a central server).

In some examples, the transceiver(s) 826 can include any sort of transceivers known in the art. For example, the transceiver(s) 826 may include wired communication components, such as a wired modem or Ethernet port, for communicating with a LAN. The transceiver(s) 826 can include wireless modem(s) to facilitate wireless connectivity with a central server, other vehicles, the Internet, and/or an intranet. Further, the transceiver(s) 826 may include a radio transceiver that performs the function of transmitting and receiving radio frequency communications via an antenna (e.g., cellular, Wi-Fi, or Bluetooth®).

In some examples, the controller 102 can be in communication with the output device(s) 834 via a cable area network (CAN), local area network (LAN), wireless (e.g., Wi-Fi or Bluetooth®), or other suitable means. In some examples, controller 102 may include the output device(s) 834. In either of the examples, the output device(s) 834 can include any sort of output devices known in the art, such as the displays (e.g., a liquid crystal display (LCD), light emitting diode (LED) display, thin film transistor (TFT) screen, translucent displays, transparent organic light-emitting diodes (OLEDs), or the like), projectors, a touchscreen display, lights, speakers, a vibrating mechanism, or a tactile feedback mechanism to provide interactive feedback to the passenger. In some examples, the output device(s) 834 can provide the content 816 to the passengers within the vehicle, for example, or sounds associated with the content 816. Output device(s) 834 also include ports for one or more peripheral devices, such as headphones, peripheral speakers, or a peripheral display.

For instance, as discussed above, the system 100 can include a projector 104 for projecting the content 816 on various surfaces of the vehicle. Additionally, the system 100 can include displays 106 corresponding to the windows of the vehicle, which augment the outside environment with content 816. The system 100 can also utilize flexible screen technology, however, in which the interior panels of the vehicles themselves can the content 816. Thus, the dashboard, door panels, and/or other interior components can display images or video directly on their surfaces.

In some examples, the controller 102 can be in communication with the internal sensor(s) 832 via a cable area network (CAN), local area network (LAN), wireless (e.g., Wi-Fi or Bluetooth®), or other suitable means. In some examples, controller 102 may include the internal sensor(s) 832. In either of the examples, internal sensor(s) 832 can include any sort of input devices known in the art. For example, internal sensor(s) 832 may include a microphone, a keyboard/keypad/touchpad, a touch-sensitive display, a proximity sensor, gyroscope, accelerometer, altimeter, IMU, and other sensors. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the internal sensor(s) 832 can also include communication ports to receive data from external sensors or cameras, among other things.

As discussed above, in some examples, the system 100 can utilize data from existing external sensors 108 on the vehicle. In other examples, the system 100 can comprise one or more internal sensor(s) 832 mounted in the controller 102 or connected to the controller 102 during installation. In some examples, some of the internal sensor(s) 832 can be housed in the controller 102 and the rest of the internal sensor(s) 832 can be installed on the vehicle and connected to the controller 102 (e.g., using a wired or wireless connection)—as opposed to using embedded, or external sensors 108, from the vehicle. This can enable the system 100 to be installed on vehicles as an aftermarket installation.

As shown in FIG. 8, therefore, in some examples, the controller 102 can include one or more internal sensor(s) 832. The internal sensor(s) 832 can specifically include, for example, a navigation module 836 (e.g. IMUs, GPS, etc), one or more cameras 838, one or more accelerometers 840, one or more gyroscopes 842, and one or more magnetometers 844, among other things. In this configuration, the navigation module 836 can provide location data for the controller 102 to determine when the vehicle has reached a pick-up or drop-off location, for example. The navigation module 836 can include, for example, at least one onboard GPS receiver, cellular location services, internet-based location services, simultaneous localization and mapping (SLAM), or other suitable navigation technology.

The one or more camera(s) 838 can comprise one or more standard cameras mounted on the controller 102 or mounted on the vehicle and connected to the controller 102. For instance, the one or more camera(s) 838 can include video cameras, still camera, depth cameras, RGB-D cameras, RGB cameras, intensity cameras, time-of-flight cameras, thermographic cameras, or any other type of camera. In some examples, the controller 102 can be dashboard mounted to enable it to be easily installed on the vehicle. In this configuration, the controller 102 can have camera(s) 838 similar to current dashboard cameras, for example, obviating the need to install cameras on the vehicle. In other examples, the camera(s) 838 can be installed in various locations on the vehicle—such as on the bumpers, the license plate holder, the front and rear dashboard, etc.—and then connected to the controller 102 via a wired (e.g., coaxial cable) or wireless (e.g., Bluetooth®) connection.

The camera(s) 838 can include one or more forward, side, and/or rearward looking cameras 838. The camera(s) 838 can provide streaming video, still pictures, or combinations thereof to the application 804, the analysis module 808, the object module 810, the content module 812, or any combination therein. The camera(s) 838 may provide periodic updates based on, for example, the velocity of the vehicle, and the depth of field of the current view, viewing angle, and the placement of the camera(s) 838, among other things. In some examples, the controller 102 may include any number of camera 838. For instance, the controller 102 may utilize one or more camera 838 to acquire incoming vehicle data 806 representing a first side of the passenger compartment of the vehicle, and one or more cameras 838 to acquire incoming vehicle data 806 representing a second side of the passenger compartment of the vehicle.

As the name implies, the one or more accelerometers 840 can provide acceleration data to the controller 102 and, by extrapolation, for the vehicle. This, along with data from the gyroscopes 842, may be useful to enable the application 804 to detect turns or swerves, for example, to enable the application 804 to update the content 816 being provided based on the movement of the vehicle that is procedurally generated. As discussed herein, when the controller 102 detects a movement of the vehicle, the controller 102 can identify new objects that are proximate to the vehicle, and provide content 816 that is associated with the newly identified objects.

As discussed above, the controller 102 can identify new objects that are proximate to the vehicle, and provide content 816 that is associated with the newly identified objects.

Figure 9:
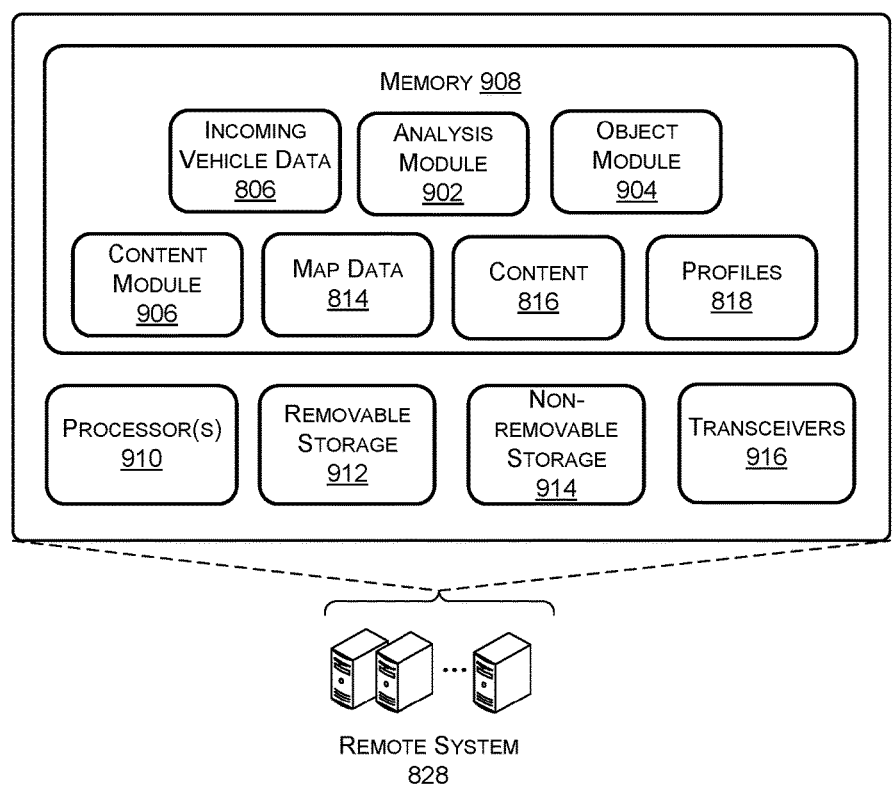
FIG. 9 is a component level schematic diagram of an example of a remote system for providing content to a vehicle.

It should be noted that, in some examples, the remote system 828 may include all of and/or a portion of the components of the controller 102. For instance, as illustrated in FIG. 9, the remote system 828 may include an analysis module 902, an object module 904, a content module 906, which may process incoming vehicle data 806 similar to the analysis module 808, the object module 810, and the content module 812, respectively. In such examples, the remote system 828 can receive the incoming vehicle data 806 acquired by the controller 102, and then use the incoming vehicle data 806 to provide content 816 to the passengers within the vehicle using a similar process as described above.

For instance, the remote system 828 can analyze the incoming vehicle data 806 using the analysis module 902, the object module 904, and the content module 906 in order to determine a pose of the passenger, the vehicle, and/or the object (in any number of coordinate systems), a point of gaze of the passenger, a surface for providing content, one or more objects that are proximate to the vehicle (including information about the detected objects, e.g. a size, height, pose, classification, etc), and content to provide. The remote system 828 can then send the controller 102 data indicating the surface for providing the content 816, along with the content 816 that the vehicle is to provide. Based on receiving the data, the controller 102 can cause the content 816 to be provided at the surface.

Also illustrated in FIG. 9, the remote system 828 can also include memory 908, processor(s) 910, removable storage 912, non-removable storage 914, and transceiver(s) 916. Additionally, the remote system 828 can include map data 814, content 816, and profiles 828.

In various examples, the memory 908 can be volatile (such as random access memory, or RAM), non-volatile (such as read only memory, or ROM, flash memory, etc.), or some combination of the two. The processor(s) 910 can comprise a central processing unit (CPU), a graphics processing unit (GPU), or both a CPU and a GPU, or any other sort of processing unit. The processor(s) 910 can be responsible for running software on the remote system 828, the analysis module 902, the object module 904, and the content module 906, and to interpret and send messages to vehicles, if applicable. In some examples, the processor(s) 910 can also perform calculations and provide instructions based on the incoming vehicle data 806.

The remote system 828 can also include additional data storage devices (removable and/or non-removable) such as, for example, magnetic disks, optical disks, or tape. Such additional storage is illustrated in FIG. 9 by removable storage 912 and non-removable storage 914. The removable storage 912 and non-removable storage 914 can store the various modules, programs, and algorithms, navigation, data gathering, and marketing processes and can include routines for receiving and scheduling routes, among other things.

Non-transitory computer-readable media may include volatile and nonvolatile, removable and non-removable tangible, physical media implemented in technology for storage of information, such as computer readable instructions, data structures, program modules, or other data. The memory 908, removable storage 912, and non-removable storage 914 are all examples of non-transitory computer-readable media. Non-transitory computer-readable media include, but are not limited to, RAM, ROM, electronically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the controller 102. Any such non-transitory computer-readable media may be part of the controller 102 or may be a separate device (e.g., a jump drive) or a separate database or databank (e.g. at a central server).

In some examples, the transceiver(s) 916 can include any sort of transceivers known in the art. For example, the transceiver(s) 916 may include wired communication components, such as a wired modem or Ethernet port, for communicating with a LAN. The transceiver(s) 916 can include wireless modem(s) to facilitate wireless connectivity with a central server, other vehicles, the Internet, and/or an intranet. Further, the transceiver(s) 916 may include a radio transceiver that performs the function of transmitting and receiving radio frequency communications via an antenna (e.g., cellular, Wi-Fi, or Bluetooth®).

Figure 10B:
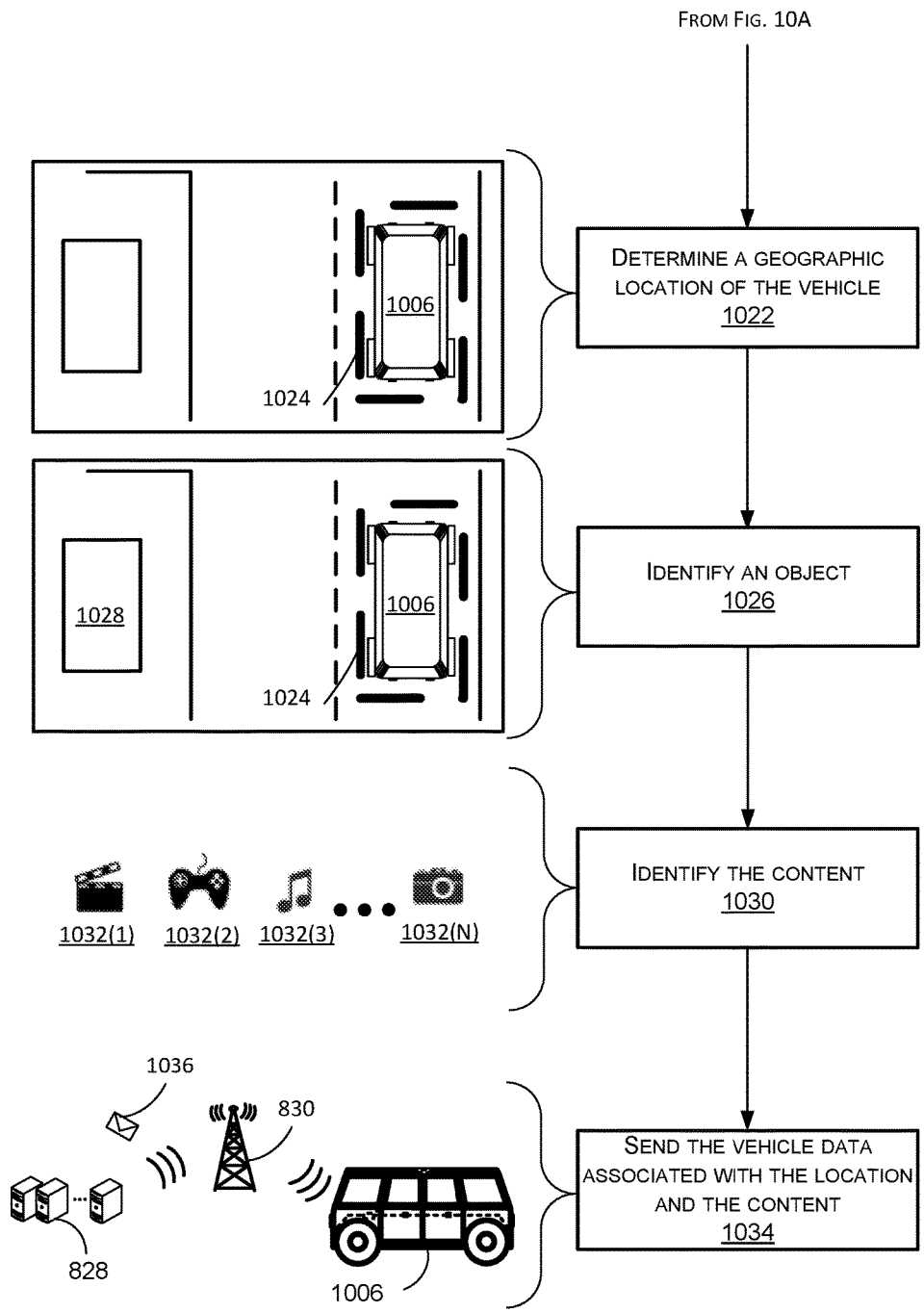

In some instances, the remote system 828 can provide content to passengers within a vehicle. For example, FIGS. 10A-10B are a flowchart depicting an example process of a remote system providing a passenger within a vehicle with content, in accordance with some examples of the present disclosure. At 1002, the remote system 828 can receive sensor data 1004 from a vehicle 1006 (and/or from the system within the vehicle 1006). For instance, the remote system 828 can receive image data 1004 from the vehicle 1006, wherein the image data 1004 represents a passenger within the passenger compartment of the vehicle 1006. In some examples, the remote system 828 can continuously receive the sensor data 1004 from the vehicle 1006. In some examples, the remote system 828 can receive the sensor data 1004 from the vehicle 1006 when the passenger enters the vehicle 1006.

At 1008, the remote system 828 can analyze the sensor data 1004 to determine a pose 1010 of a passenger 1012 within the vehicle 1006. For instance, the remote system 828 can analyze the sensor data 1004 using one or more computer-vision algorithms associated with pose estimation to detect a pose 1010 of the passenger 1012 within the vehicle 1006. In some examples, the pose 1010 of the passenger 1012 includes the three-dimensional location and orientation of the head of the passenger 1012 within the vehicle 1006. In some examples, the pose 1010 of the passenger 1012 includes the three-dimensional location and orientation of the eyes of the passenger 1012 with respect to the head of the passenger 1012.

At 1014, the remote system 828 can detect a gaze direction 1016 of the passenger 1012 within the vehicle 1006. For instance, the remote system 828 can analyze the sensor data 1004 using one or more computer-vision algorithms associated with gaze detection to detect the gaze direction 1016 of the passenger 1012. In some examples, the gaze direction 1016 corresponds the direction in which the passenger 1012 is currently looking within the vehicle 1006. For instance, in some examples, the remote system 828 can utilize the one or more computer-vision algorithms to analyze the sensor data 1004 in order to detect the face of the passenger 1012, and, based on detecting the face, monitor the pupil of each of the eyes of the passenger 1012. While monitoring, the remote system 828 can calculate the direction in which the passenger 1012 is currently looking within the vehicle 1006.

At 1018, the remote system 828 can identify a surface 1020 within the vehicle 1006 to present the content. For instance, the remote system 828 can use the pose 1010 of the passenger 1012 and the gaze direction 1016 of the passenger 1012 to determine a region of interest within the vehicle 1006. In some examples, the region of interest corresponds to the location within the vehicle 1006 at which the passenger 1012 is looking. The remote system 828 can then identify a surface 1020 to present content based on the region of interest. For example, if the region of interest includes a translucent display of the vehicle 1006, such as a window, the remote system 828 can determine that the surface 1020 includes the translucent display.

At 1022, the remote system 828 can determine the geographic locational 1024 of the vehicle 1006 (i.e. a location and/or orientation). For instance, the vehicle 1006 may include components, such as a GPS receiver and/or other location-based component, that acquire sensor data associated with the geographical location 1024. The vehicle 1006 can then send the sensor data to the remote system 828. In some examples, the vehicle 1006 may send the sensor data to the remote system 828 periodically, or upon receiving a message from the remote system 828 requesting the sensor data. In some examples, the vehicle 1006 may continuously send the sensor data to the remote system 828. Additionally, or in the alternative, sensor data 1004 may be used to provide the geographic location 1024, as well as to localize the vehicle in an environment (e.g. via algorithms such as SLAM, Kalman filters, particle filters, bundle adjustment, or the like).

At 1026, the remote system 828 can identify an object 1028. For instance, the remote system 828 can identify, based on the geographic location 1024, one or more objects that are proximate to the vehicle 1006 using the techniques described above. In some instances, the remote system 828 can further identify an object of interest 1028 from the one or more identified objects. For instance, the remote system 828 may utilize the pose 1010 of the passenger 1012, the gaze direction 1016 of the passenger 1012, and map data to identify the object of interest 1028 using the techniques described above. Additionally, or in the alternative, the remote system 828 can use the sensor data 1004 to detect and/or recognize one or more objects in the environment, as well as provide information about the objects (e.g. a classification, size, pose, height, etc).

At 1030, the remote system 828 can identify content 1032. As discussed above, content can include advertisements, videos 1032(1) (e.g., movies, television shows, etc.), text (e.g., books, news articles, etc.), games 1032(2), educational material, music 1032(3), images 1032(N), or any other type of content that the system can provide to the passenger. In some examples, the remote system 828 can identify content 1032 for the passenger 1012 within the vehicle 1006 using similar processes as described above in step 714 of FIG. 7. For instance, the remote system 828 can identify content 1032 that is associated with the one or more objects and/or the object of interest 1028. In some examples, to identify the content 1032, the remote system 828 can use one or more profiles associated with one or more of the objects.

At 1034, the remote system 828 can send the vehicle 1006 data 1036 associated with the surface 1020 and the content 1032. For instance, the remote system 828 can send the vehicle 1006 data 1036 that indicates that the vehicle 1006 should provide content to the passenger 1012 using the surface 1020. Additionally, the remote system 828 can send the vehicle 1006 data 1036 indicating the type of content 1032 that the vehicle 1006 should provide. In some examples, if the vehicle 1006 does not already have the content 1032 stored locally, such as in memory, the remote system 828 can further send the vehicle 1006 data associated with the content 1032.

In some examples, the remote system 828 causes the vehicle 1006 to provide the content 1032 based on the remote system 828 sending the data 1036 to the vehicle 1006. For instance, in response to receiving the data 1036, the vehicle 1006 may provide the content 1032 to the passenger 1006 using the surface 1020. Additionally, in some examples, the remote system 828 may continually receive sensor data 1004 from the vehicle 1006, analyze the sensor data 1004, and send the vehicle 1006 updated data 1036 in response. In some examples, the content 1032 may be transformed in such a way as to create an augmented reality experience for the passenger. Such a transformation may be based at least in part on the relative location of the object, the pose of the vehicle, the pose of the passenger and gaze direction, and object information (e.g. size, pose, etc).

While several possible examples are disclosed above, examples of the present disclosure are not so limited. For instance, while systems and methods for providing content based on a head gaze of a passenger, the system can be used in non-autonomous vehicles and other situations without departing from the spirit of the disclosure. In addition, the location and configuration used for various features of examples of the present disclosure such as, for example, the order of steps, the components of the system 100, 200, 300, whether the system 100, 200, 300 uses projectors or displays (e.g., translucent displays), or other features can be changed to accommodate variations due to, for example, the size or construction of the vehicle, the type of vehicle (e.g., automobile vs. boat vs. plane), or the type of traveling environment. Such changes are intended to be embraced within the scope of this disclosure.

The specific configurations, components, the size and shape of various elements, and whether certain components are separate from, or embedded in, the vehicle can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. An autonomous vehicle, comprising:
    a projector disposed in substantially a center of an interior portion of the autonomous vehicle;
    one or more processors; and
    one or more computer-readable media storing instructions that, when executed by the one or more processors, cause the one or more processors to perform operations comprising:
        obtaining image data representing a passenger within the autonomous vehicle;
        analyzing the image data to determine a pose of a head of the passenger;
        determining an eye position relative to the head of the passenger;
        determining a gaze direction of the passenger;

determining a surface within the autonomous vehicle for providing content based, at least in part, on the gaze direction and the eye position; and causing the projector to output the content for the passenger at the surface.

2. The autonomous vehicle of claim 1, further comprising:
one or more optical devices for acquiring the image data;
one or more surfaces;
and wherein the operations further comprising:
identifying the surface based, at least in part, on the gaze direction and the eye position; and
determining that an object is visible to the passenger through the surface,
and wherein causing the projector to output the content comprises causing the projector to output the content such that the object is augmented with the content.

3. The autonomous vehicle of claim 2, the operations further comprising:
determining a first portion of the surface in which the object is visible to the passenger based, at least in part, on the gaze direction and the eye position; and
determining a second portion for augmenting the object with the content based, at least in part, on the first portion,
and wherein causing the projector to output the content comprises causing the projector to output the content within the second portion.

4. The autonomous vehicle of claim 1, the operations further comprising:
receiving map data that represents a geographical region, wherein the geographical region includes a geographical location associated with the autonomous vehicle;
identifying, using the map data, one or more objects that are located within a predetermined distance of the autonomous vehicle;
identifying an object from the one or more objects based, at least in part, on the gaze direction and the eye position; and
identifying the content based, at least in part, on the object.

5. The autonomous vehicle of claim 1, the operations further comprising:
receiving sensor data indicating a direction of travel of the autonomous vehicle;
determining a projected route of the autonomous vehicle based, at least in part, on the sensor data;
identifying an object that is located along the projected route of the autonomous vehicle; and
identifying the content based, at least in part, on the object.

6. The autonomous vehicle of claim 1, the operations further comprising:
receiving sensor data representing an environment outside of the autonomous vehicle;
analyzing the sensor data to identify an object located within the environment; and
identifying the content based, at least in part, on the object.

7. A method, comprising:
obtaining sensor data representing a passenger within an autonomous driverless vehicle as the autonomous driverless vehicle travels along a road, the autonomous driverless vehicle including a first surface and a second surface, the second surface being associated with a direction of travel of the autonomous driverless vehicle at a time of obtaining the sensor data;

analyzing the sensor data to detect a gaze direction of the passenger;
determining a line of sight of the passenger based, at least in part, on the gaze direction of the passenger;
determining that the first surface is within the line of sight of the passenger; and
causing display of content on the first surface while refraining from displaying the content on the second surface.

8. The method of claim 7, further comprising:
receiving additional sensor data indicating the direction of travel of the autonomous driverless vehicle;
determining, using map data representing a geographic region, a projected route of the autonomous driverless vehicle based, at least in part, on the additional sensor data;
identifying an object based, at least in part, on the projected route; and
identifying the content based, at least in part, on the object.

9. The method of claim 7, wherein the first surface includes a translucent display of the autonomous driverless vehicle, and the method further comprising:
receiving map data that represents a geographic region;
identifying, using the map data, one or more objects that are within a predetermined distance to the autonomous driverless vehicle; and
identifying an object from the one or more objects that is visible to the passenger through the translucent display,
and wherein causing the display of the content comprises causing display of the content on the first surface such that the object is augmented with the content.

10. The method of claim 7, further comprising:
obtaining a profile associated with the passenger; and
identifying the content based, at least in part, on the profile of the passenger.

11. The method of claim 7, further comprising:
receiving additional sensor data from one or more sensors of the autonomous driverless vehicle, the additional sensor data representing an environment outside of the autonomous driverless vehicle; and
analyzing the additional sensor data to detect an object outside of the autonomous driverless vehicle,
and wherein causing the display of the content comprises causing display of the content on the first surface such that the object is augmented with the content.

12. The method of claim 7, further comprising:
obtaining additional sensor data representing the passenger within the autonomous driverless vehicle;
analyzing the additional sensor data to detect an additional gaze direction of the passenger;
identifying, based at least in part on the additional gaze direction, a third surface; and
causing display of additional content on the third surface so that the passenger can view the additional content when looking in the additional gaze direction.

13. The method of claim 7, wherein the first surface comprises at least one of a surface on a door panel or a surface on a seat.

14. The method of claim 7, wherein the first surface includes a translucent surface of the autonomous driverless vehicle, and the method further comprising:
identifying an object that is within the line of sight of the passenger; and
determining the content based, at least in part, on the object, the content comprising at least one of an advertisement that is related to the object, a video that is related to the object, or an image that is related to the object.

15. A method comprising:
obtaining image data representing a passenger within a vehicle;
analyzing the image data to identify a pose of a head of the passenger;
analyzing the image data to identify a gaze direction of the passenger;
identifying a non-transparent surface of the vehicle based, at least in part, on the pose and the gaze direction of the passenger; and
causing display of content at the non-transparent surface.

16. The method of claim 15, further comprising:
determining a geographical location associated with the vehicle;
identifying one or more objects that are within a predetermined distance of the vehicle based, at least in part, on the geographical location;
identifying a line of sight of the passenger based, at least in part, on the pose and the gaze direction of the passenger;
determining that an object of the one or more objects is associated with the line of sight; and
identifying that the content is associated with the object.

17. The method of claim 16, wherein causing display of the content comprises causing display of the content to augment the object for the passenger.

18. The method of claim 15, further comprising:
receiving sensor data indicating a direction of travel of the vehicle;
determining, using map data representing a geographic region, a projected route of the vehicle;
identifying an object based, at least in part, on the projected route; and
identifying the content based, at least in part, on the object.

19. The method of claim 15, further comprising:
obtaining additional image data representing an additional passenger within the vehicle;
analyzing the additional image data to identify a pose of a head of the additional passenger;
analyzing the additional image data to identify a gaze direction of the additional passenger;
identifying an additional surface of the vehicle based, at least in part, on the pose and the gaze direction of the additional passenger; and
causing display of additional content at the additional surface.

20. The method of claim 15, further comprising:
identifying a line of sight of the passenger based, at least in part, on the pose and the gaze direction of the passenger;
identifying a region of interest of the passenger based, at least in part, on the line of sight; and
determining that the region of interest is located on the non-transparent surface,
and wherein identifying the surface comprises determining that the region of interest is located on the non-transparent surface.

* * * * *